US010936267B2

(12) United States Patent
Suga

(10) Patent No.: US 10,936,267 B2
(45) Date of Patent: Mar. 2, 2021

(54) COMMUNICATION APPARATUS

(71) Applicant: CANON KABUSHIKI KAISHA, Tokyo (JP)

(72) Inventor: Kenichiro Suga, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/548,570

(22) Filed: Aug. 22, 2019

(65) Prior Publication Data

US 2019/0377531 A1 Dec. 12, 2019

Related U.S. Application Data

(63) Continuation of application No. 16/056,239, filed on Aug. 6, 2018, now Pat. No. 10,430,138.

(30) Foreign Application Priority Data

Aug. 10, 2017 (JP) .............................. JP2017-155516
Aug. 10, 2017 (JP) .............................. JP2017-155517

(51) Int. Cl.
*G06F 3/12* (2006.01)
*H04W 72/10* (2009.01)
(Continued)

(52) U.S. Cl.
CPC .......... *G06F 3/1292* (2013.01); *G06F 3/1236* (2013.01); *H04W 36/36* (2013.01);
(Continued)

(58) Field of Classification Search
CPC .... G06F 3/1292; G06F 3/1236; H04W 36/36; H04W 48/16; H04W 72/02; H04W 72/04;
(Continued)

(56) References Cited

U.S. PATENT DOCUMENTS 9,497,680 B1 ‡ 11/2016 Tran ...................... H04W 36/14
2004/0048571 A1 ‡ 3/2004 Kiyose .................. G01C 21/16
455/41.2

(Continued)

FOREIGN PATENT DOCUMENTS

JP 2005-277937 A ‡ 10/2005
JP 2011-259372 A ‡ 12/2011 ............ H04W 12/06
(Continued)

OTHER PUBLICATIONS https://cweb.canon.jp/p1s/webcc/WC_SHOW_CONTENTS.EdtDsp?i_cd_pr_catg=011&i_tx_contents_dir=/e-support/faq/answer/inkjetmfp/&i_tx_contents_file=65525-1.html&i_fl_edit=1&i_tx_search_pr_name=&i_ck_qasearch=Q000065525 Document No. Q000065525; "How to connect ot Wireless LAN (Wi-Fi) using 'Wireless Start Easily' (MG8230/MG6230)", Dec. 2, 2016.‡

(Continued)

*Primary Examiner* — Moustapha Diaby
(74) *Attorney, Agent, or Firm* — Canon U.S.A., Inc. I.P. Division

(57) ABSTRACT

In a case where the setting information does not include a frequency band information corresponding to the first frequency band and does not include a frequency band information corresponding to the second frequency band or in a case where the setting information includes the frequency band information corresponding to the first frequency band and the frequency band information corresponding to the second frequency band, the communication apparatus wirelessly connects with the external apparatus using the first frequency band with priority than the second frequency.

43 Claims, 10 Drawing Sheets

(51) Int. Cl.
*H04W 36/36* (2009.01)
*H04W 72/02* (2009.01)
*H04W 48/16* (2009.01)
*H04W 72/04* (2009.01)
*H04W 84/12* (2009.01)

(52) U.S. Cl.
CPC ........... *H04W 48/16* (2013.01); *H04W 72/02* (2013.01); *H04W 72/10* (2013.01); *H04W 72/0453* (2013.01); *H04W 84/12* (2013.01)

(58) Field of Classification Search
CPC .. H04W 72/10; H04W 72/0453; H04W 84/12
See application file for complete search history.

(56) References Cited

U.S. PATENT DOCUMENTS

| | | | | |
|---|---|---|---|---|
| 2007/0274275 | A1 ‡ | 11/2007 | Laroia | H04L 5/0035 370/338 |
| 2012/0224569 | A1 * | 9/2012 | Kubota | H04W 84/20 370/338 |
| 2012/0307839 | A1 ‡ | 12/2012 | Ionescu | A61N 1/3727 370/431 |
| 2013/0028110 | A1 ‡ | 1/2013 | Kogawa | H04W 74/0808 370/25 |
| 2013/0148161 | A1 ‡ | 6/2013 | Park | G06F 3/1296 358/1.15 |
| 2013/0171941 | A1 ‡ | 7/2013 | Kenney | H04W 76/14 455/62 |
| 2013/0329600 | A1 * | 12/2013 | Vedula | H04W 76/14 370/254 |
| 2014/0177548 | A1 * | 6/2014 | Aihara | H04W 72/02 370/329 |
| 2014/0320908 | A1 ‡ | 10/2014 | Iwauchi | H04L 45/24 358/1 |
| 2015/0250012 | A1 * | 9/2015 | Shibata | H04W 84/20 370/254 |
| 2016/0007200 | A1 ‡ | 1/2016 | Shibata | H04W 76/10 713/168 |
| 2016/0037504 | A1 * | 2/2016 | Tamura | H04W 72/0446 370/336 |
| 2016/0094726 | A1 ‡ | 3/2016 | Abe | H04W 48/16 358/1.15 |
| 2017/0070976 | A1 ‡ | 3/2017 | Shirakawa | H04W 48/20 |
| 2017/0245276 | A1 * | 8/2017 | Kim | H04L 67/1063 |
| 2018/0324876 | A1 * | 11/2018 | Iwami | H04W 84/12 |

FOREIGN PATENT DOCUMENTS

| | | | | |
|---|---|---|---|---|
| JP | 2013-030845 A | ‡ | 2/2013 | ........ H04W 74/0808 |
| JP | 2014-068134 A | ‡ | 4/2014 | |
| JP | 2014-225861 A | ‡ | 12/2014 | ............. H04L 45/22 |
| WO | WO-2017/085978 A1 | ‡ | 5/2017 | ............ H04W 84/12 |

OTHER PUBLICATIONS https://tech.nikkeibp.co.jp/it/article/COLUMN/20070829/280660/ The reference states "Dynamic Frequency Selection". "The ability of IEEE 802. 11n [Technical version] 10th article in series: the combination of 40Mz width has 10 patterns", Sep. 14, 2007.‡ https://support.brother.co.jp/j/b/faqend.aspx?c=jp&lang=ja&prod=mfc9340cdw&faqid=faq00012229_015;"FAQs: How to connect to Wireless LAN using WPS/AOSSTM (MFC-9340CDW)", Jul. 10, 2017.‡ http://flets-w.com/user/point-otoku/knowledge/wi-fi/wi-fi06.html; Q. What is IEEE802. (11a), (11b), (11g) , (11n), (11ac)?, NTT WEST, Apr. 8, 2016.‡

* cited by examiner
‡ imported from a related application

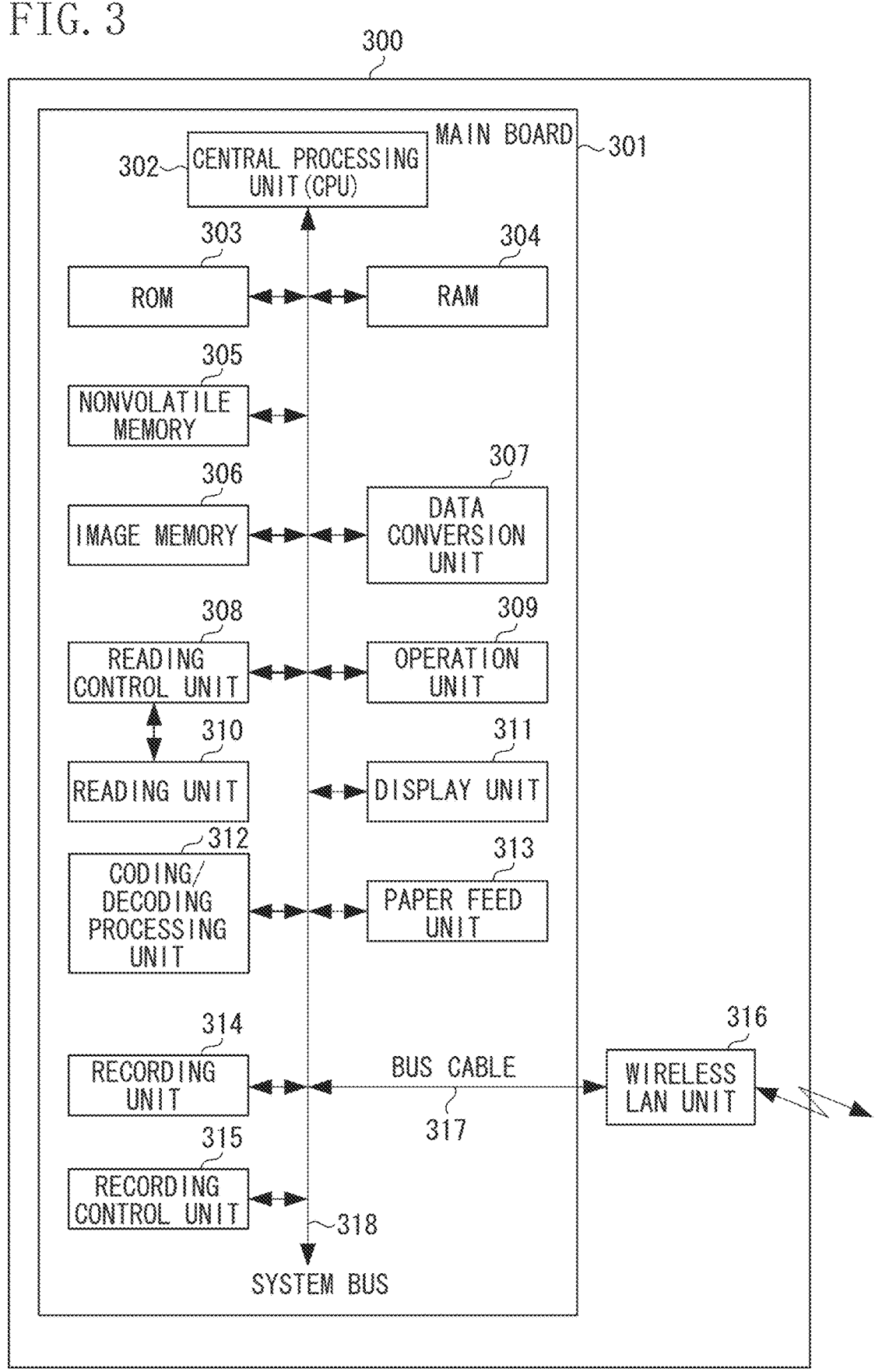

FIG. 4A

|   | SSID | FREQUENCY | AUTHENTICATION METHOD | CODING METHOD | PASSPHRASE |
|---|---|---|---|---|---|
| 1 | AOSS-1 | 2.4 GHz | OPEN | WEP64 | 11111 |
| 2 | AOSS-8 | 5 GHz | WPA2-PSK | AES | 88888888 |
| 3 | AOSS-5 | 5 GHz | OPEN | WEP64 | 55555 |
| 4 | AOSS-3 | 2.4 GHz | WPA2-PSK | TKIP | 33333333 |
| 5 | AOSS-6 | 5 GHz | OPEN | WEP128 | 6666666666666 |
| 6 | AOSS-4 | 2.4 GHz | WPA2-PSK | AES | 44444444 |
| 7 | AOSS-2 | 2.4 GHz | OPEN | WEP128 | 2222222222222 |
| 8 | AOSS-7 | 5 GHz | WPA2-PSK | TKIP | 77777777 |

FIG. 4B

|   | SSID | FREQUENCY | AUTHENTICATION METHOD | CODING METHOD | PASSPHRASE |
|---|---|---|---|---|---|
| 1 | RAKU-2 | 5 GHz | WPA2-PSK | AES | 22222222 |
| 2 | RAKU-1 | 2.4 GHz | WPA2-PSK | AES | 11111111 |

FIG. 4C

|   | SSID | FREQUENCY | AUTHENTICATION METHOD | CODING METHOD | PASSPHRASE |
|---|------|-----------|----------------------|---------------|------------|
| 1 | WPS-4 | 5 GHz | OPEN | WEP64 | 44444 |
| 2 | WPS-3 | 2.4 GHz | WPA2-PSK | AES | 33333333 |
| 3 | WPS-6 | 5 GHz | WPA2-PSK | AES | 66666666 |
| 4 | WPS-2 | 2.4 GHz | WPA2-PSK | TKIP | 22222222 |
| 5 | WPS-5 | 5 GHz | WPA2-PSK | TKIP | 55555555 |
| 6 | WPS-1 | 2.4 GHz | OPEN | WEP64 | 11111 |

FIG. 4D

|   | SSID | FREQUENCY | AUTHENTICATION METHOD | CODING METHOD | PASSPHRASE |
|---|------|-----------|----------------------|---------------|------------|
| 1 | WPS-4 |  | OPEN | WEP64 | 44444 |
| 2 | WPS-3 |  | WPA2-PSK | AES | 33333333 |
| 3 | WPS-6 |  | WPA2-PSK | AES | 66666666 |
| 4 | WPS-2 |  | WPA2-PSK | TKIP | 22222222 |
| 5 | WPS-5 |  | WPA2-PSK | TKIP | 55555555 |
| 6 | WPS-1 |  | OPEN | WEP64 | 11111 |

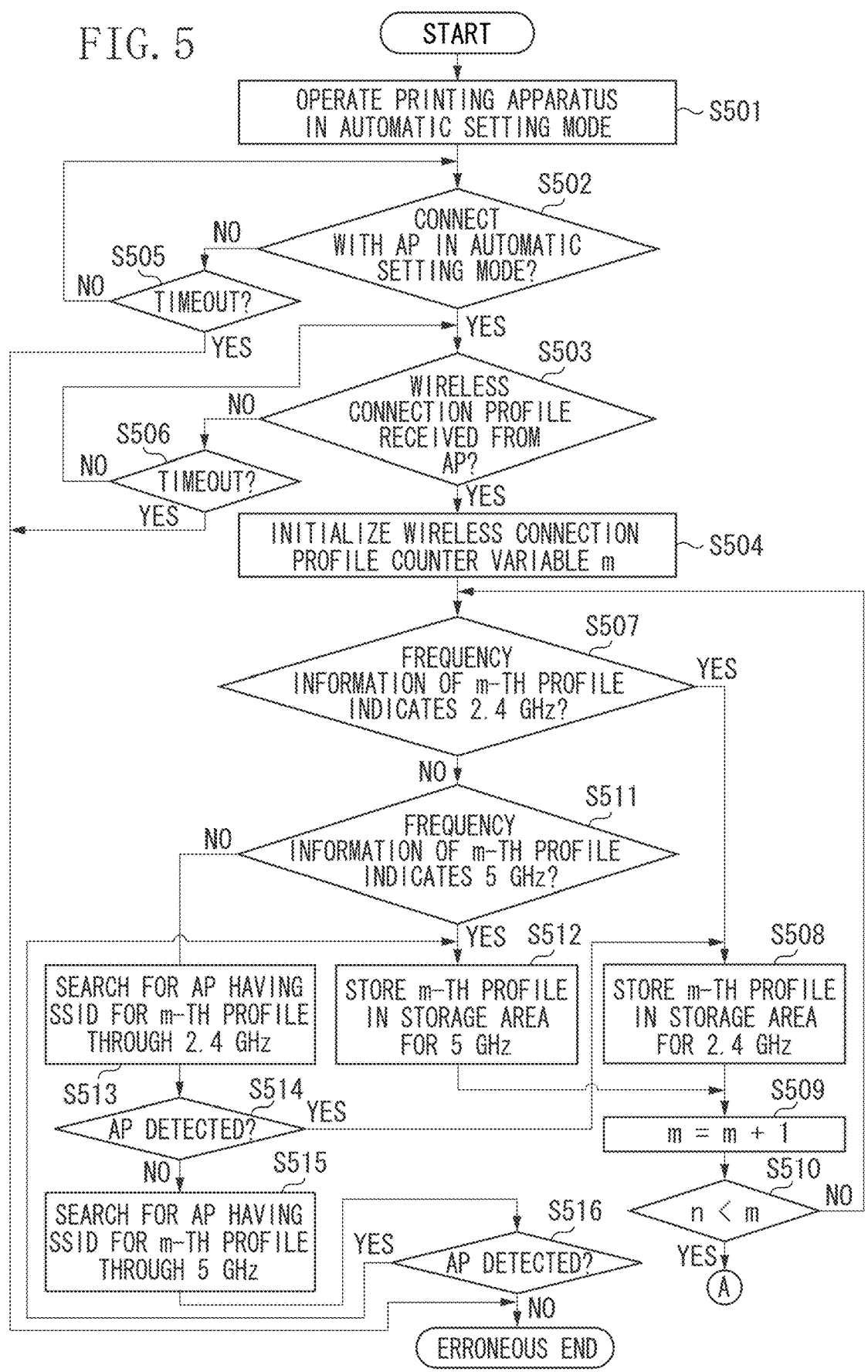

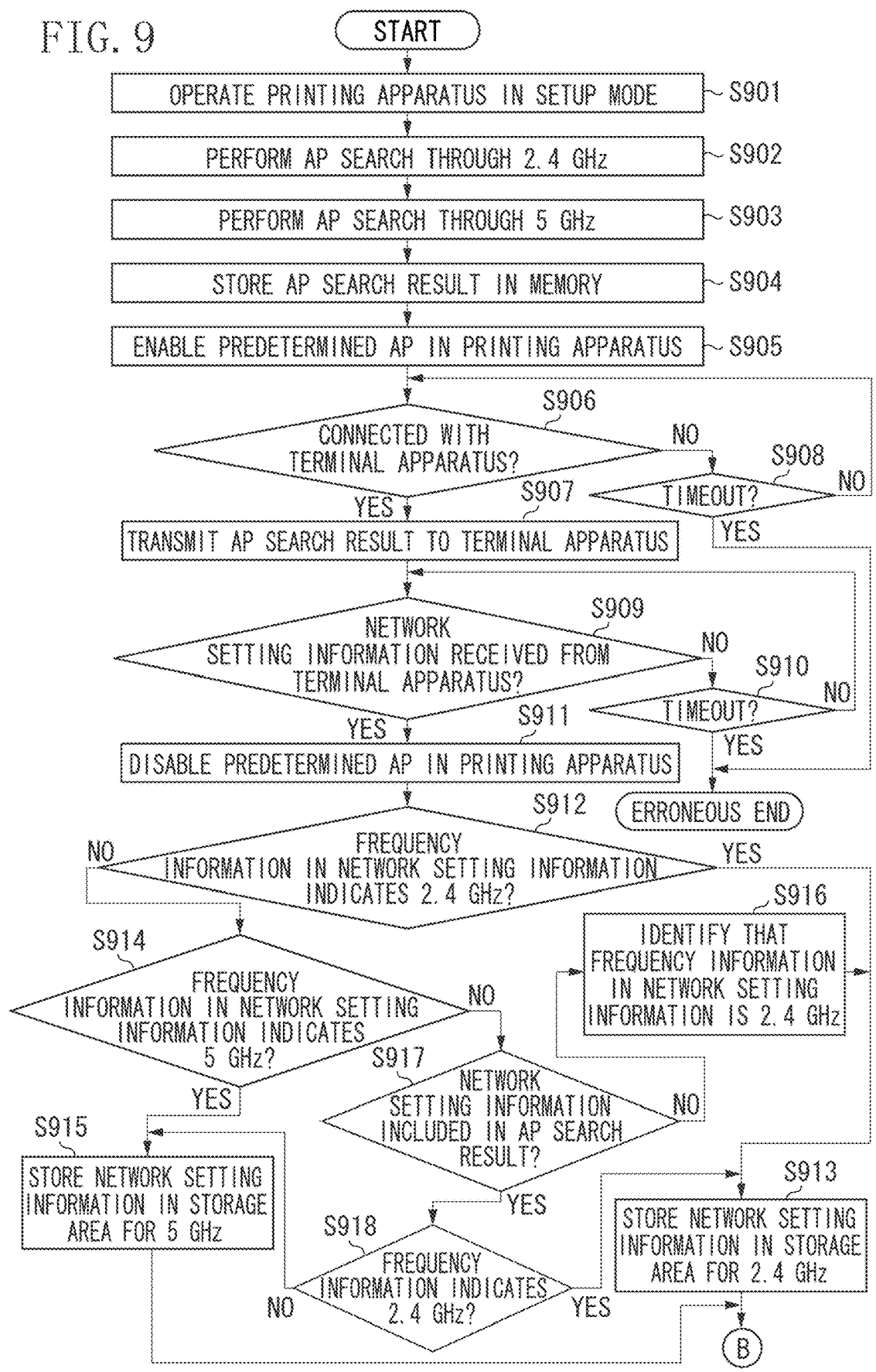

COMMUNICATION APPARATUS

CROSS REFERENCE TO RELATED APPLICATIONS

The present application is a continuation of U.S. patent application Ser. No. 16/056,239, filed on Aug. 6, 2018, which claims priority from Japanese Patent Application No. 2017-155517, filed Aug. 10, 2017, and Japanese Patent Application No. 2017-155516, filed Aug. 10, 2017, which are hereby incorporated by reference herein in their entirety.

BACKGROUND

Field

The present disclosure relates to a communication apparatus.

Description of the Related Art

A technique is known for performing network setting processing to wirelessly connect a communication apparatus, such as a printing apparatus, and an external apparatus, such as an access point.

Japanese Patent Application Laid-Open No. 2011-259372 discusses a technique for connecting an access point and a wireless communication apparatus when wireless parameters including frequency channels are transmitted from the access point to the wireless communication apparatus.

In recent years, communication apparatuses including a plurality of available frequency bands (for example, 2.4 GHz and 5 GHz) have become popular. The communication apparatuses also receive information (frequency band information) about the frequency band used to connect with an external apparatus in the network setting processing and connects with the external apparatus. However, no consideration has been provided regarding control in which, when the communication apparatus receives a plurality of pieces of frequency band information corresponding to a plurality of different frequency bands as frequency band information in the network setting processing, the communication apparatuses connect with an external apparatus using a suitable frequency band out of the plurality of available frequency bands.

SUMMARY

The present disclosure is directed to providing control in which, when a communication apparatus including a plurality of available frequency bands receives a plurality of pieces of frequency band information corresponding to a plurality of different frequency bands, the communication apparatus is controlled to connect with an external apparatus using a suitable frequency band out of the plurality of available frequency bands.

According to an aspect of the present disclosure, a communication apparatus that wirelessly communicates in a first frequency band and a second frequency band includes a receiving unit configured to receive setting information used in processing for wirelessly connecting with an external apparatus, a connection unit configured to wirelessly connect, in a case where the setting information does not include a frequency band information corresponding to the first frequency band and does not include a frequency band information corresponding to the second frequency band or in a case where the setting information includes the frequency band information corresponding to the first frequency band and the frequency band information corresponding to the second frequency band, with the external apparatus using the first frequency band with priority than the second frequency, a second receiving unit configured to receive a print job via the wireless connection with the external apparatus, and a printing unit configured to perform printing on a recording medium by using a recording agent based on the print job; wherein the first frequency band is a 2.4 GHz frequency band, the second frequency band is a 5 GHz frequency band.

According to another aspect of the present disclosure, a communication apparatus that wirelessly communicates in a first frequency band and a second frequency band, the communication apparatus includes a first receiving unit configured to receive setting information used in processing for wirelessly connecting with an external apparatus, a connection unit configured to wirelessly connect, in a case where the setting information does not include a frequency band information corresponding to the first frequency band and does not include a frequency band information corresponding to the second frequency band or in a case where the setting information includes the frequency band information corresponding to the first frequency band and the frequency band information corresponding to the second frequency band, with the external apparatus using the first frequency band with priority than the second frequency, a second receiving unit configured to receive a print job via the wireless connection with the external apparatus, and a printing unit configured to perform printing on a recording medium by using a recording agent based on the print job, wherein, in a case where the external apparatus identifies that a specific apparatus is performing communication through a first channel from among a plurality of communication channels supporting the second frequency band, a channel currently used in wireless connection using the second frequency band between the external apparatus and the communication apparatus is changed from the first channel to a second channel from among the plurality of communication channels supporting the second frequency band.

Further features will become apparent from the following description of exemplary embodiments with reference to the attached drawings.

BRIEF DESCRIPTION OF THE DRAWINGS

FIG. 3 is a schematic view illustrating a configuration of a printing apparatus.

FIGS. 4A to 4D illustrate examples of wireless connection profiles.

FIG. 5 is a flowchart illustrating network setting processing based on an automatic setting method performed by the printing apparatus.

FIG. 9 is a flowchart illustrating yet another network setting processing using the terminal apparatus performed by the printing apparatus.

DESCRIPTION OF THE EMBODIMENTS

An exemplary embodiment will be described in detail below with reference to the accompanying drawings. Unless otherwise specifically described, relative arrangements of elements and display screens described in the present exemplary embodiment are not limited thereto, and the scope of the present disclosure is not limited to the exemplary embodiment.

An information processing apparatus and a communication apparatus included in a communication system according to a first exemplary embodiment will be described below. While, in the present exemplary embodiment, a personal computer (PC) is applied as an example of an information processing apparatus, this is not seen to be limiting. A portable terminal, smart phone, tablet terminal, personal digital assistant (PDA), digital camera, and other various apparatuses are also applicable as an information processing apparatus. While, in the present exemplary embodiment, a printer is applied as an example of a communication apparatus, this is not seen to be limiting. Various apparatuses capable of wirelessly communicating with an information processing apparatus are also applicable as a communication apparatus. Examples of printers to which the present disclosure is applicable include an ink-jet printer, full color laser beam printer, and monochrome printer. The present disclosure is also applicable not only to a printer, but also to a copying machine, facsimile, portable terminal, smart phone, PC, tablet terminal, PDA, digital camera, music reproduction device, and television. The present disclosure is also applicable to a multifunction peripheral having a plurality of functions such as a copy function, FAX function, and printing function.

The following description is of a configuration of the information processing apparatus according to the present exemplary embodiment, and a configuration of the communication apparatus capable of communicating with the information processing apparatus according to the present exemplary embodiment. Although the present exemplary embodiment will be described below centering on the following configuration, the present exemplary embodiment is applicable to an apparatus capable of communicating with a communication apparatus. In particular, the functions of the apparatus are not limited thereto.

Figure 2:
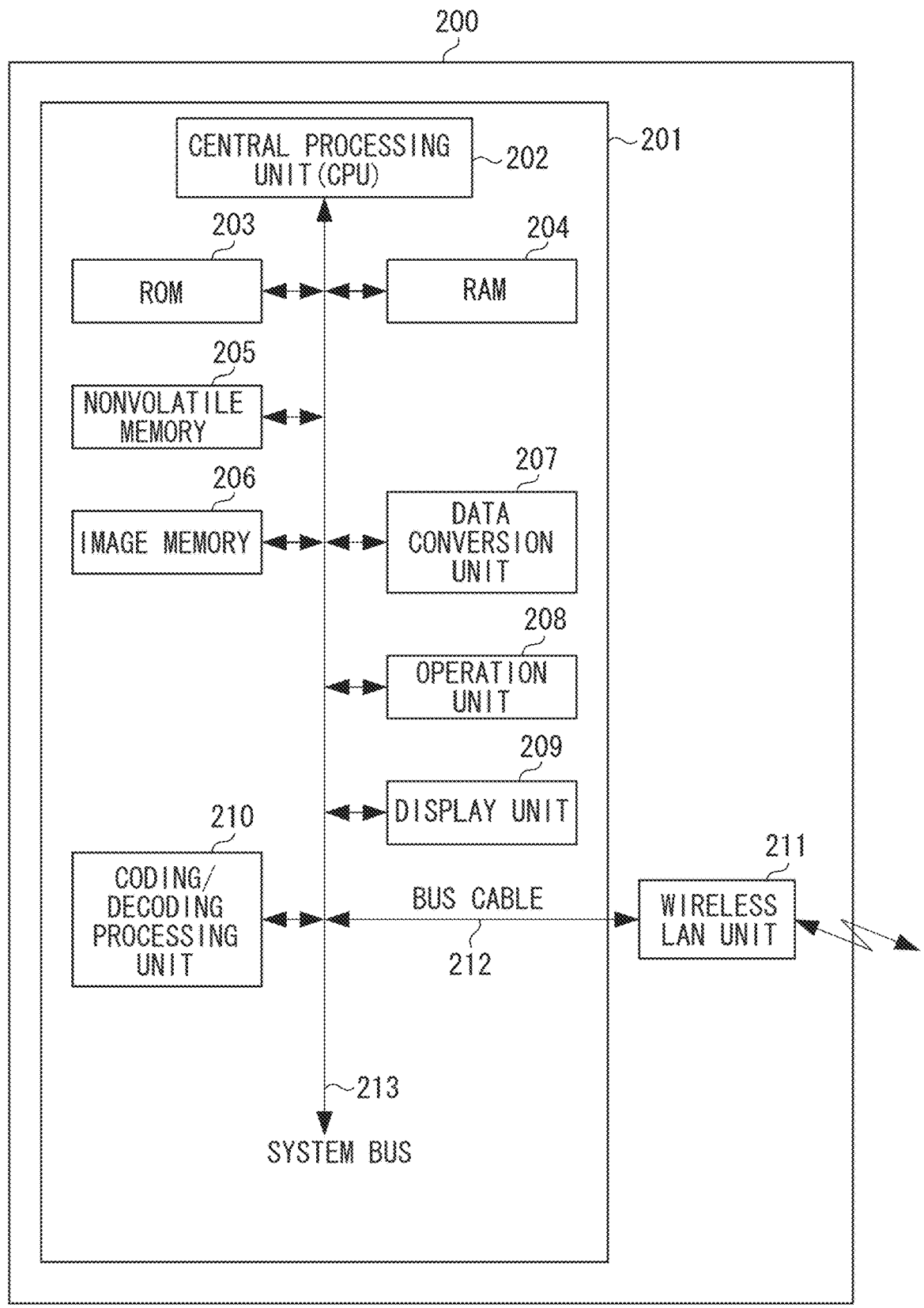
FIG. 2 is a schematic view illustrating a configuration of a portable terminal.

FIG. 2 is a block diagram schematically illustrating a terminal apparatus 200 as an information processing apparatus according to the present exemplary embodiment.

The terminal apparatus 200 includes a main board 201 for performing main control of the apparatus.

The main board 201 includes a central processing unit (CPU) 202 as a system control unit for controlling the entire terminal apparatus 200. A read only memory (ROM) 203 stores various programs to be executed by the CPU 202, such as control programs and an embedded operating system (hereinafter referred to as an OS). According to the present exemplary embodiment, control programs stored in a read only memory (ROM) 203 perform software control, such as scheduling and task switching, under control of the embedded OS stored in the ROM 203. A random access memory (RAM) 204 includes a static RAM and stores program control variables, user-registered setting values, and management data of the terminal apparatus 200. The RAM 204 has various working buffer areas. These pieces of setting information data can be stored in other storage areas, such as the ROM 203 and a nonvolatile memory 205, instead of the RAM 204.

The nonvolatile memory 205 includes a flash memory and stores data which needs to be retained even when power is OFF. More specifically, the nonvolatile memory 205 stores network information including a password and authentication information for connecting with a network, and setting information of the terminal apparatus 200 including a list of communication apparatuses connected in the past (Media Access Control (MAC) address and Service Set Identifier (SSID)). According to the present exemplary embodiment, the nonvolatile memory 205 also stores connection information for easy connection mode (described below). These pieces of data can be stored in other storage areas such as the ROM 203 and the RAM 204 instead of the nonvolatile memory 205. The CPU 202 can load the setting information stored in the ROM 203 and the nonvolatile memory 205 into the RAM 204 to perform processing by using the stored data.

An image memory 206 includes a dynamic RAM (DRAM) and stores various data such as image data received via a wireless local area network (LAN) unit 211 and image data processed by a coding/decoding processing unit 210.

The memory configuration of the terminal apparatus 200 is not limited thereto. More specifically, the number of memories, memory characteristics, and storage capacity can be suitably changed according to applications and purposes. For example, the image memory 206 and the RAM 204 can be a common memory. Although the image memory 206 includes a DRAM but not limited thereto. The image memory 206 can include a hard disk drive (HDD) and a nonvolatile memory.

A data conversion unit 207 generates data, such as Page Description Language (PDL) data, and performs data conversion, such as color conversion and image conversion, for image data.

An operation unit 208 and a display unit 209 receive various inputs to the terminal apparatus 200 and display various information about the terminal apparatus 200.

The coding/decoding processing unit 210 performs coding/decoding processing, enlargement/reduction processing, and other various processing on image data.

The wireless LAN unit 211 achieves wireless LAN communication conforming to the Wireless Fidelity (Wi-Fi®) standard. The wireless LAN unit 211 has a function of performing beacon detection processing and authentication processing for establishing a wireless LAN connection, and a function of transmitting a print job to a communication apparatus with which a wireless LAN connection is established. The wireless LAN unit 211 is connected to a system bus 213 via a bus cable 212. The CPU 202 is able to control the wireless LAN unit 211 to operate an access point (AP) in the terminal apparatus 200.

According to the present exemplary embodiment, the terminal apparatus 200 transmits a print job for instructing the printing apparatus 300 to perform printing via the wireless LAN unit 211. Jobs transmitted to the printing apparatus 300 are not limited to print jobs and can be scan jobs for instructing the printing apparatus 300 to perform scanning, copy jobs for instructing the printing apparatus 300 to perform copying, and setting commands for changing the settings of the printing apparatus 300. When the communication apparatus according to the present exemplary embodiment is a storage device, data (such as image data and moving image data) to be stored in the communication apparatus as well as jobs can be transmitted to the printing apparatus 300. When a scan job is transmitted to the printing apparatus 300, image data generated by scanning a document based on the scan job is transmitted to the terminal apparatus 200.

The wireless LAN unit 211 can directly communicate with the printing apparatus 300 via wireless communication or can communicate with the printing apparatus 300 via an external apparatus outside the terminal apparatus 200 and the printing apparatus 300. External apparatuses include access points, such as router apparatuses, and apparatuses other than access points capable of relaying communication.

While, in the present exemplary embodiment, the wireless LAN unit 211 uses the IEEE 802.11 series standard (Wi-Fi®), Bluetooth® is usable. According to the present exemplary embodiment, a method in which the terminal apparatus 200 and the printing apparatus 300 are directly connected without using an external apparatus is referred to as a direct connection method. A method in which the terminal apparatus 200 and the printing apparatus 300 are connected via an external apparatus is referred to as an infrastructure connection method. According to the present exemplary embodiment, a connection via an access point is to be established by the wireless LAN unit 211.

The above-described components 202 to 212 are connected with each other via the system bus 213 under control of the CPU 202.

The terminal apparatus 200 can include a communication unit other than the wireless LAN unit 211. The terminal apparatus 200 can include a plurality of communication units and perform communication based on a plurality of different communication methods. The terminal apparatus 200 can also directly communicate with other apparatuses via wireless communication or communicate with other apparatuses via an access point outside the terminal apparatus 200 on a network. Examples of communication methods include Bluetooth® Low Energy, Near Field Communication (NFC): ISO/IEC IS18092), and Wi-Fi Aware™. In addition, wired communication can be used instead of wireless communication.

FIG. 3 is a block diagram schematically illustrating the printing apparatus 300 as a communication apparatus according to the present exemplary embodiment.

The printing apparatus 300 includes a main board 301 for performing main control of the apparatus.

The main board 301 includes a CPU 302 as a system control unit for controlling the entire printing apparatus 300. A ROM 303 stores various programs to be executed by the CPU 302, such as control programs and an embedded OS program. According to the present exemplary embodiment, control programs stored in the ROM 303 perform software control, such as scheduling and task switching, under control of the embedded OS stored in the ROM 303. The RAM 304 includes a SRAM and stores program control variables, user-registered setting values, management data of the printing apparatus 300, and setting information of the mode change conditions (described below). The RAM 304 has various working buffer areas. These pieces of data can be stored in other storage areas, such as the ROM 303 and the nonvolatile memory 305, instead of the RAM 304.

The nonvolatile memory 305 includes a flash memory and stores data which needs to be retained even when power is OFF. More specifically, the nonvolatile memory 305 stores network information including a password and authentication information for connecting with a network, and setting information of the printing apparatus 300 including a list of communication apparatuses connected in the past (MAC address and SSID), menu items such as printing modes, and recording head correction information. These pieces of setting information data can be stored in other storage areas such as the ROM 303 and the RAM 304 instead of the nonvolatile memory 305. The CPU 302 may load the setting information stored in the ROM 303 and the nonvolatile memory 305 into the RAM 304 to perform processing by using the setting information.

An image memory 306 includes a dynamic RAM and stores various data such as image data received via a wireless LAN unit 316 and image data processed by a coding/decoding processing unit 312.

The memory configuration of the printing apparatus 300 is not limited thereto. More specifically, the number of memories, memory characteristics, and storage capacity can be suitably changed according to applications and purposes. For example, the image memory 306 and the RAM 304 can be a common memory. Although the image memory 306 includes a DRAM but not limited thereto. The image memory 306 can include an HDD and a nonvolatile memory.

A data conversion unit 307 performs, via an image processing control unit (not illustrated), various image processing including smoothing processing, recording density correction processing, and color correction on image data included in a received job. The data conversion unit 307 performs these pieces of processing to convert the printing target image data into high-definition printing data and outputs the converted printing data to a recording unit 314.

A reading unit 310 optically reads a document by using a Contact Image Sensor (CIS). A reading control unit 308 performs various image processing including binarization processing and intermediate color processing on the image signal obtained through reading by the reading unit 310 and outputs high-definition image data.

An operation unit 309 and a display unit 311 receive various inputs to the printing apparatus 300 and display various information about the printing apparatus 300.

The coding/decoding processing unit 312 performs coding/decoding processing, enlargement/reduction processing, and other various processing on image data.

A paper feed unit 313 holds recording media for printing and supplies the recording media to the recording unit 314 under control of a recording control unit 315. The paper feed unit 313 includes a plurality of paper cassettes.

The recording control unit 315 controls which paper cassette out of a plurality of the paper cassettes paper is to be fed from. The recording control unit 315 periodically reads various information such as the status of the recording unit 314 to play a role of updating the information in the RAM 304. More specifically, the recording control unit 315 updates the status of the printing apparatus 300, such as "in use", "sleeping", and "error occurred", and the remaining ink amounts in ink tanks.

The recording unit 314 performs image forming processing (printing processing) for forming (printing) an image on a recording medium by using a recording agent such as ink, based on the printing data output from the data conversion unit 307 and print setting information included in a print job.

The wireless LAN unit 316 is a unit for achieving wireless LAN communication conforming to the Wi-Fi® standard. The wireless LAN unit 316 has a function of performing connection information transmission processing and authentication processing for establishing a wireless LAN connection, and a function of receiving a job from a terminal apparatus with which a wireless LAN connection is established. The wireless LAN unit 316 is connected to a system bus 318 via a bus cable 317. The CPU 302 is able to control the wireless LAN unit 211 to operate an access point in the printing apparatus 300. More specifically, the CPU 302 is able to control the printing apparatus 300 to operate as a GroupOwner or soft AP. According to the present exemplary embodiment, a connection via an access point is to be established by the wireless LAN unit 316.

The above-described components 302 to 317 are connected with each other via the system bus 318 under control of the CPU 302.

The printing apparatus 300 can include a communication unit other than the wireless LAN unit 316. The printing apparatus 300 can directly communicate with other apparatuses via wireless communication or communicate therewith via an access point outside the printing apparatus 300 installed on a network. According to the present exemplary embodiment, when directly communicating with other apparatuses, the printing apparatus 300 operates as a GroupOwner or soft AP. Examples of communication methods include Bluetooth®, NFC, and Wi-Fi Aware™. The printing apparatus 300 can communicate with other apparatuses not only via wireless communication but also via wired communication such as a cable LAN. The printing apparatus 300 receives a job from other external apparatuses such as the terminal apparatus 200 via networks conforming to these communication methods. According to the present exemplary embodiment, the printing apparatus 300 performs direct communication not by using channels supporting the 5 GHz frequency band but by using channels supporting the 2.4 GHz frequency band. However, the direct communication is not limited thereto. For example, the printing apparatus 300 can perform direct communication by using channels without switching through Dynamic Frequency Selection (DFS) to be described below (channels not to be used by a specific apparatus such as a weather radar) out of the channels supporting the 5 GHz frequency band. According to the present exemplary embodiment, the printing apparatus 300 is to use at least either one of the 2.4 GHz and the 5 GHz frequency bands based on the IEEE-802.11 series standard for wireless connection. The printing apparatus 300 is provided with communication channels supporting the available frequency bands. For example, if the 2.4 GHz frequency bands are available, the printing apparatus 300 is provided with 13 communication channels each of which is assigned to a different one of predetermined frequency bands out of the 2.4 GHz frequency bands. For example, if the 5 GHz frequency bands are available, the printing apparatus 300 is provided with 24 communication channels each of which is assigned to a different one of predetermined frequency bands out of the 5 GHz frequency bands.

Figure 1:
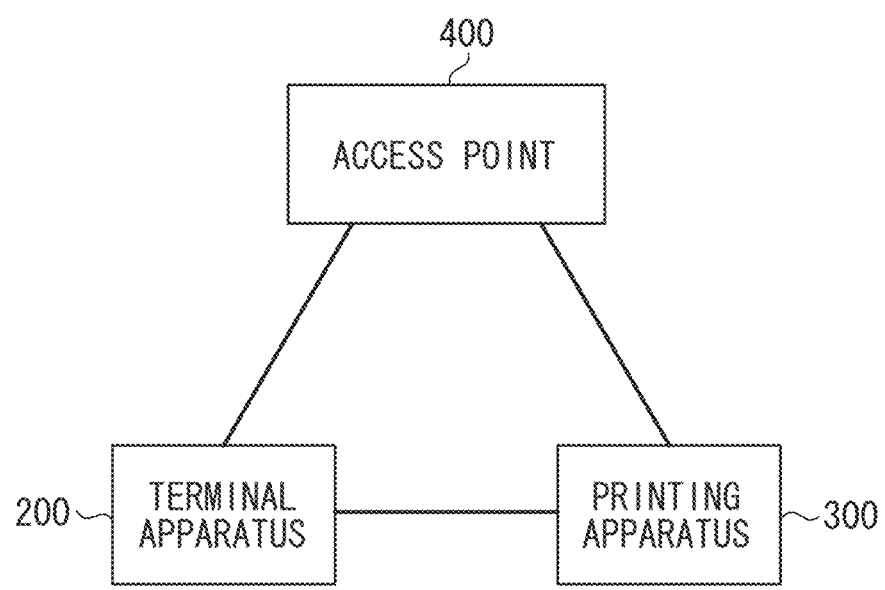
FIG. 1 is a schematic view illustrating a communication system.

FIG. 1 illustrates the communication system according to the present exemplary embodiment. The communication system according to the present exemplary embodiment includes the terminal apparatus 200, the printing apparatus 300, and an access point 400. The printing apparatus 300 and the terminal apparatus 200 establish a wireless LAN connection via the access point 400 outside each apparatus, whereby the apparatuses can communicate with each other. Each of the printing apparatus 300 and the terminal apparatus 200 is also able to operate as an access point by enabling the access point in each apparatus. Therefore, for example, if either one apparatus serves as an access point and the other apparatus connects with the access point, the terminal apparatus 200 and the printing apparatus 300 are able to directly establish a wireless LAN connection without using the access point 400. Since both the terminal apparatus 200 and the printing apparatus 300 have a wireless LAN function, peer-to-peer (hereinafter referred to as P2P) communication is achieved through mutual authentication.

The access point 400 is a router apparatus. A router apparatus is an apparatus for relaying data communication between apparatuses (for example, between an information processing apparatus and a communication apparatus). According to the present exemplary embodiment, a router apparatus serves as an access point and relays data communication between apparatuses connected to the access point of the router apparatus. The router apparatus can use a wireless communication method, a wired communication method, or both communication methods. According to the present exemplary embodiment, the router apparatus has a wireless LAN router function for enabling communication at least with a wireless communication method.

According to the present exemplary embodiment, the printing apparatus 300 is connected to the access point 400 via a wireless LAN. More specifically, the terminal apparatus 200 is capable of communicating with the printing apparatus 300 via the access point 400. More specifically, the terminal apparatus 200 connects with the printing apparatus 300 via an infrastructure connection. Establishing an infrastructure connection enables the printing apparatus 300 and the terminal apparatus 200 to communicate with apparatuses belonging to a network formed by the access point 400. When the access point 400 is connected to the Internet, the printing apparatus 300 and the terminal apparatus 200 can also use the Internet via the access point 400.

The present exemplary embodiment will be described below centering on a configuration for executing setting processing (network setting processing) for establishing a connection between the printing apparatus 300 and the access point 400 to establish the above-described infrastructure connection.

As a more specific example of a method for network setting processing, the terminal apparatus 200 transmits network setting information to the printing apparatus 300 to establish a connection between the printing apparatus 300 and the access point 400. Examples of network setting information include connection information (SSID and a password) used for connection with the access point 400 as a connection target of the printing apparatus 300. When the printing apparatus 300 requests the access point 400 for connection, the printing apparatus 300 transmits the connection information to the access point 400. For example, other methods for network setting processing include AirStation One-Touch Secure System (AOSS™), Rakuraku Musen Start (Easy Wireless Start), and Wi-Fi Protected Setup™ (WPS). In these methods, when the printing apparatus 300 receives the network setting information directly from the access point 400 without using the terminal apparatus 200, a connection between the printing apparatus 300 and the access point 400 is established. Hereinafter, these methods are referred to as automatic setting methods.

A wireless connection is performed by using a specific frequency band. In recent years, an apparatus capable of using a plurality of frequency bands (for example, 2.4 GHz and 5 GHz frequency bands) has been used as the printing apparatus 300. The printing apparatus 300 according to the present exemplary embodiment is also capable of performing wireless connection by using a plurality of frequency bands. When connecting with an access point, the printing apparatus 300 first searches for access points (AP search) by using the communication channels supporting the available frequency bands. Then, the printing apparatus 300 transmits a connection request to the access point corresponding to the thus-received connection information by using the communication channel supporting the available frequency band to wirelessly connect with the access point.

Therefore, if the thus-configured printing apparatus 300 does not know which frequency band is to be used to wirelessly connect with an access point, the printing apparatus 300 is unable to connect with the access point. For example, the printing apparatus 300 may be configured to execute an AP search by using the available frequency bands to try establishing a connection with an access point even if the printing apparatus 300 does not know which frequency band is to be used. However, since the printing apparatus 300 is generally unable to simultaneously use a plurality of frequency bands, the printing apparatus 300 will sequentially use the available frequency bands one by one in the above-described configuration. In this case, the printing apparatus 300 may try establishing a connection by using frequency bands other than the frequency bands for connecting with an access point. More specifically, even in the above-described configuration, the printing apparatus 300 may consume time to connect with an access point or perform useless processing.

In network setting processing, it is desirable that information about frequency bands (frequency band information) available for the connection target access point is notified to the printing apparatus 300. The frequency band information is also information about the frequency band to be used for connection with the connection target access point.

The frequency band information may not be notified to the printing apparatus 300 depending on the method for network setting processing, the model and installed software type of the connection target access point, and the model and installed software type of the terminal apparatus 200 performing the network setting processing. As a more specific example, in WPS, the frequency band information may not be notified to the printing apparatus 300 since whether the frequency band information is notified to the printing apparatus 300 depends on the model of the access point. For example, depending on the type of the OS mounted on the terminal apparatus 200, the terminal apparatus 200 may be unable to acquire the frequency band information and therefore, for example, the information may not be notified to the printing apparatus 300. This causes an issue that the printing apparatus 300 is unable to determine which frequency band is to be used in the network setting processing.

For example, when the connection target access point supports a plurality of frequencies, a plurality of pieces of frequency band information may be notified. As a more specific example, both information corresponding to the 2.4 GHz band and information corresponding to the 5 GHz band may be notified as frequency band information. Also, in this case, an issue may arise, i.e., the printing apparatus 300 is unable to determine which frequency band out of a plurality of frequency bands is to be used in the network setting processing.

The present exemplary embodiment will be described below centering on a configuration in which, even if the frequency band information is not notified to the printing apparatus 300 in the network setting processing, the printing apparatus 300 tries establishing a connection with an access point by using a suitable frequency band.

The present exemplary embodiment will also be described below centering on a configuration in which, even if a plurality of pieces of information about frequency bands available for the connection target access point is notified to the printing apparatus 300 in the network setting processing, the printing apparatus 300 tries establishing a connection with the access point by using a suitable frequency band.

More specifically, in the above-described case, the printing apparatus 300 tries establishing a connection by using 2.4 GHz with priority over 5 GHz. The following describes the reason why, in the present exemplary embodiment, the printing apparatus 300 tries establishing a connection with an access point by using 2.4 GHz with priority over 5 GHz.

According to the present exemplary embodiment, the printing apparatus 300 is able to simultaneously (in parallel) operate in both a mode for performing communication via an infrastructure connection (infrastructure communication mode) and a mode for performing communication via a direct connection (direct communication mode (P2P mode)). Therefore, the printing apparatus 300 is able to simultaneously (in parallel) establish and maintain both the infrastructure and the direct connections.

The direct connection is a connection in a wireless network configured by the printing apparatus 300 and the terminal apparatus 200. Either one of the printing apparatus 300 and the terminal apparatus 200 serves as an AP (master station, parent station) and the other (non-AP apparatus) serves as a client (slave station, child station). In the wireless network according to the present exemplary embodiment, the printing apparatus 300 serves as an AP in the direct connection mode. The direct communication mode includes the Wi-Fi Direct® (WFD) mode in which the printing apparatus 300 operates as a GroupOwner and the soft AP mode in which the printing apparatus 300 operates as a soft AP. The SSID and password of the AP enabled by the printing apparatus 300 are different in each mode.

The infrastructure connection is a connection in a wireless network configured by the access point 400. The infrastructure connection is a connection in a wireless network configured by the access point 400 serving as an AP (master station) and the printing apparatus 300 serving as a client (slave station).

Hereinafter, an operation in which the printing apparatus 300 and the terminal apparatus 200 simultaneously (in parallel) establish an infrastructure connection and a direct connection and simultaneously (in parallel) operate for communication via the infrastructure and the direct connections is referred to as a simultaneous operation. In the simultaneous operation, the terminal apparatus 200 with which the printing apparatus 300 is connected via the direct connection is different from the terminal apparatus 200 with which the printing apparatus 300 is connected via the infrastructure connection. More specifically, the printing apparatus 300 is connectable with a plurality of apparatuses through the simultaneous operation.

Communication via the infrastructure connection and communication via the direct connection are performed by using specific frequency bands (specific channels). Therefore, in both communication via the infrastructure connection and communication via the direct connection, the channel to be used for communication and connection between the apparatuses before starting communication is determined. In a communication configuration in which a plurality of channels is simultaneously assigned to one wireless integrated circuit (IC) chip, each apparatus will have a complicated configuration and perform complicated processing. Therefore, for example, when the printing apparatus 300 performs the simultaneous operation, it is desirable that a common channel is used in communication in each mode. More specifically, even during the simultaneous operation, it is desirable that the printing apparatus 300 uses only one channel. Therefore, according to the present exemplary embodiment, the wireless LAN unit 316 includes only one wireless IC chip for achieving communication through a predetermined channel, and the printing apparatus 300 does not perform communication by simultaneously using a plurality of channels.

If the printing apparatus 300 is operating as a GroupOwner or soft AP, the printing apparatus 300 as a master station can arbitrarily determine the channel to be used for the direct connection. However, the channel to be used for the infrastructure connection is determined by the access point 400 which serves as a master station in the infrastructure connection. Therefore, when the printing apparatus 300 performs the simultaneous operation, it is desirable to determine as a channel to be used for the direct connection the channel to be used for the infrastructure connection determined by the access point 400.

However, in the direct connection using the channel supporting 5 GHz, a DFS function (described below) is applied. Depending on the apparatus configuration, the existence of this function may make it impossible or undesirable for the printing apparatus 300 to perform the direct connection by using the channel supporting 5 GHz. As a more specific example, it may be impossible or undesirable for the wireless IC chip included in the wireless LAN unit 316 to operate as a GroupOwner or soft AP (i.e., master station) by using the channel supporting 5 GHz. DFS will be described below.

In communication using a specific frequency band such as 5 GHz, the apparatus operating as a GroupOwner or soft AP, and the master station such as the access point 400 needs to perform a technique called DFS. DFS is a technique for controlling apparatuses so that communication therebetween does not affect a weather radar. When a specific apparatus such as a weather radar is using a specific frequency, an interference wave is generated by the specific frequency. DFS is also a technique for switching the frequency (channel) used by the master station among specific frequency bands including the specific frequency. More specifically, when the master station detects an interference wave in the frequency currently being used by the master station, the master station stops communication based on the specific frequency band for a predetermined time period (for example, for one minute). During the communication stop, the printing apparatus 300 confirms whether a new channel to be used after canceling the communication stop is available (whether the frequency corresponding to the channel is being used by a specific apparatus such as a weather radar). When the printing apparatus 300 confirms that the channel is available, the master station cancels the communication stop and resumes communication based on the new channel. An operation of a certain master station to detect an interference wave in a frequency currently being used for communication by the master station corresponds to an operation of the master station to identify that a specific apparatus such as a weather radar is using the frequency currently being used for communication by the master station. A technique called Transmit Power Control (TPC) is also a similar technique to DFS.

When the master station detects that a specific apparatus, such as a weather radar, is using the communication channel currently being used, it is the master station in the communication system that needs to perform control for switching the communication channel currently being used. When the communication channel currently being used is switched by the master station, the slave station follows this processing. More specifically, also in the infrastructure connection through 5 GHz, when the access point 400 switches the channel through DFS, the printing apparatus 300 switches the channel following the channel switching.

DFS and TPC are applied to communication in specific frequency bands such as 5 GHz and are not applied to communication in frequency bands such as 2.4 GHz. More specifically, the printing apparatus 300 does not switch the channel currently being used for communication in the 2.4 GHz frequency band depending on the communication status of a specific apparatus, such as a weather radar. This is because a specific apparatus, such as a weather radar, performs communication by using the 5.0 GHz frequency band but does not perform communication by using the 2.4 GHz frequency band. More specifically, when communication between apparatuses is performed by using the 5 GHz frequency band, channel switching is performed through DFS and TPC. When channel switching is performed through DFS, as described above, channel switching is performed between the channels supporting the 5 GHz frequency band.

When the printing apparatus 300 using a wireless chip not conforming to DFS serves as a master station, the printing apparatus 300 is unable to switch, through DFS, the communication channel currently being used and is unable to perform direct connection through 5 GHz. As described above, the channels to be used for the infrastructure and the direct connections are shared in the simultaneous operation. The printing apparatus 300 which is unable to perform the direct connection through 5 GHz has an issue that the printing apparatus 300 is unable to perform the simultaneous operation when it uses 5 GHz in the infrastructure connection.

Since the printing apparatus 300 uses a wireless chip conforming to DFS, there remains the following issue even if the direct connection through 5 GHz can be performed. As described above, the channel to be used for the direct connection may be changed through DFS. However, in the simultaneous operation, the channels to be used for the infrastructure and the direct connections are shared, and the channel to be used for the infrastructure connection cannot be determined by the printing apparatus 300. More specifically, even if the channel to be used for the direct connection is changed through DFS during the simultaneous operation, the channel to be used for the infrastructure connection cannot be changed by the printing apparatus 300. Therefore, the channels to be used for the infrastructure and the direct connections cannot be shared. Therefore, there is an issue that the infrastructure and the direct connections cannot be maintained in parallel.

Even if the printing apparatus 300 can use both the 2.4 GHz and the 5 GHz frequency bands, it is desirable to use 2.4 GHz with priority over 5 GHz taking the execution of the simultaneous operation into consideration.

Also in the printing apparatus 300 that does not perform the simultaneous operation, the following issue may arise when the infrastructure connection is performed through 5 GHz. When channel switching is performed through DFS as described above, communication between the apparatuses is stopped for a predetermined time period. Therefore, for example, a delay or packet loss may occur in communication between apparatuses through 5 GHz.

Therefore, if the frequency band information is not notified to the printing apparatus 300 according to the present exemplary embodiment in the network setting processing, the printing apparatus 300 tries establishing a connection with the access point 400 by using 2.4 GHz with priority over 5 GHz. In the network setting processing, when a plurality of pieces of information about frequency bands available for the connection target access point is notified to the printing apparatus 300, the printing apparatus 300 uses 2.4 GHz with priority over 5 GHz for connection with the access point 400.

Meanwhile, there is an advantage of using 5 GHz. For example, generally, communication through 5 GHz provides a higher transmission rate and higher stability than communication through 2.4 GHz. The access point 400 supports 5 GHz and may not support 2.4 GHz. Therefore, when the printing apparatus 300 according to the present exemplary embodiment is notified only of information about 5 GHz as the frequency band information or is instructed to use 5 GHz by the user, the printing apparatus 300 according to the present exemplary embodiment tries establishing a connection with the access point 400 using 5 GHz.

The network setting processing based on the automatic setting method will be described below.

FIG. 5 is a flowchart illustrating the network setting processing based on the automatic setting method performed by the printing apparatus 300 according to the present exemplary embodiment. The flowchart illustrated in FIG. 5 is implemented, for example, when the CPU 302 reads a program stored in the ROM 303 or the nonvolatile memory 305 into the RAM 304 and then executes the program. The processing of the flowchart illustrated in FIG. 5 is started when a user operation as a trigger for the network setting processing (an instruction for executing the network setting processing) based on the automatic setting method is performed. More specifically, the user operation as a trigger for the network setting processing based on the automatic setting method is an operation of pressing a predetermined button included in the printing apparatus 300.

In step S501, the CPU 302 operates the printing apparatus 300 in the automatic setting mode. The automatic setting mode is a mode in which the printing apparatus 300 performs the network setting processing based on the automatic setting method. When step S501 is performed in a state where the printing apparatus 300 is operating in the direct connection mode, the printing apparatus 300 temporarily stops the operation as an AP. According to the present exemplary embodiment, information about the operation mode of the printing apparatus 300 is prestored in an operation mode storage area in a predetermined memory. Even when the processing in step S501 is performed in a state where the printing apparatus 300 is operating in the direct connection mode, information indicating that the direct connection mode is enabled is to be kept in the operation mode storage area.

The network setting processing based on the automatic setting method is performed in a state where not only the printing apparatus 300 but also the access point 400 as a connection target of the printing apparatus 300 operates in the automatic setting mode. Similarly to the printing apparatus 300, the access point 400 starts an operation as the automatic setting mode when a predetermined button is pressed by the user.

When the printing apparatus 300 and the access point 400 start operations in the automatic setting mode, each apparatus sends a signal indicating that it is operating in the automatic setting mode. When these signals are acquired between the apparatuses, each apparatus detects an apparatus subjected to the network setting processing based on the automatic setting method. Then, the apparatuses establish a connection with each other to exchange information (wireless connection profile) for performing the network setting processing based on the automatic setting method.

In step S502, the CPU 302 determines whether the printing apparatus 300 connects with an access point operating in the automatic setting mode. In a case where the CPU the CPU 302 determines that the printing apparatus 300 connects with an access point (YES in step S502), the processing proceeds to step S503. On the other hand, in a case where the CPU 302 determines that the printing apparatus 300 does not connect with an access point (NO in step S502), the processing proceeds to step S505.

In step S505, the CPU 302 determines whether a predetermined time has elapsed (timeout occurred) from when the printing apparatus 300 has started the operation as the automatic setting mode. In a case where the CPU 302 determines that timeout occurred (YES in step S505), the CPU 302 determines that an error occurs and ends the processing. On the other hand, in a case where the CPU 302 determines that timeout has not occurred (NO in step S505), the processing returns to step S502.

The access point 400 that has connected with the printing apparatus 300 operating in the automatic setting mode transmits a wireless connection profile to the printing apparatus 300. The wireless connection profile refers to information including the connection information to be used for connection with the access point 400. When the access point 400 has a plurality of SSIDs, the wireless connection profile includes a plurality of profiles corresponding to respective SSIDs. FIG. 4A illustrates an example of a wireless connection profile acquired through AOSS™. The wireless connection profile acquired through AOSS™ includes up to eight profiles. FIG. 4B illustrates an example of a wireless connection profile acquired through Rakuraku Musen Start. The wireless connection profile acquired through Rakuraku Musen Start includes up to two profiles. FIGS. 4C and 4D illustrate examples of wireless connection profiles acquired through WPS. A wireless connection profile acquired through WPS includes up to six profiles.

As illustrated in FIGS. 4A to 4D, one profile includes "SSID", "Frequency", "Authentication Method", "Coding Method", and "Passphrase". By using each piece of information included in one profile, the printing apparatus 300 is able to connect with an access point. As a more specific example, in order to connect with an access point having the wireless connection profile illustrated in FIG. 4A by using "AOSS-1" as the SSID, the printing apparatus 300 uses the 2.4 GHz frequency band. Information included in "Frequency" may not be information indicating the frequency corresponding to each SSID but can be, for example, information indicating the channel corresponding to each SSID. As described above, since a wireless connection profile acquired through WPS may not include information about "Frequency" (see FIG. 4D), the information about frequency bands available for the access point may not be notified to the printing apparatus 300.

In step S503, the CPU 302 determines whether a wireless connection profile is received from the connected access point. In a case where the CPU 302 determines that a wireless connection profile is received (YES in step S503), the processing proceeds to step S504. A wireless connection profile received from the access point includes a plurality of profiles. Therefore, when a wireless connection profile is received, the CPU 302 identifies the number (n) of profiles included in the wireless connection profile. On the other hand, in a case where the CPU 302 determines that a wireless connection profile is not received (NO in step S503), the processing proceeds to step S506.

In step S506, the CPU 302 determines whether a predetermined time has elapsed (timeout occurred) from when the printing apparatus 300 has started the operation as the automatic setting mode. In a case where the CPU 302 determines that timeout has occurred (YES in step S506), the CPU 302 determines that an error occurs and ends the processing. On the other hand, in a case where the CPU 302 determines that timeout has not occurred (NO in step S506), the processing returns to step S503.

In step S504, the CPU 302 initializes a wireless connection profile counter variable m. More specifically, the CPU 302 assigns 1 to the wireless connection profile counter variable m. The wireless connection profile counter variable m is information stored in, for example, the nonvolatile memory 305.

In step S507, the CPU 302 determines whether the m-th profile out of the n profiles indicates that the connection target access point supports 2.4 GHz. More specifically, the CPU 302 determines whether the "Frequency" column of the m-th profile out of the n profiles includes information indicating "2.4 GHz" or information indicating "Channel supporting 2.4 GHz". In a case where the CPU 302 determines that the "Frequency" column includes information indicating 2.4 GHz (YES in step S507), the processing proceeds to step S508. On the other hand, in a case where the CPU 302 determines that the "Frequency" column does not include information indicating 2.4 GHz (NO in step S507), the processing proceeds to step S511.

In step S511, the CPU 302 determines whether the m-th profile out of the n profiles indicates that the connection target access point supports 5 GHz. More specifically, the CPU 302 determines whether the "Frequency" column of the m-th profile out of the n profiles includes information indicating "5 GHz" or information indicating "Channel supporting 5 GHz". In a case where the CPU 302 determines that the "Frequency" column includes information indicating 5 GHz (YES in step S511), the processing proceeds to step S512. On the other hand, in a case where the CPU 302 determines that the "Frequency" column does not include information indicating 5 GHz (NO in step S511), the processing proceeds to step S513.

In a case where the CPU 302 determines that the "Frequency" column does not include information indicating 2.4 GHz (NO in step S507) and determines that the "Frequency" column does not include information indicating 5 GHz (NO in step S511), the m-th profile out of the n profiles does not include information about the frequency band. Therefore, the frequency band information is not notified for the m-th profile out of the n profiles. As described above, in such a case, the present exemplary embodiment uses 2.4 GHz with priority over 5 GHz.

In step S513, the CPU 302 searches for an access point having the SSID corresponding to the m-th profile out of the n profiles by using the channel supporting 2.4 GHz.

In step S514, the CPU 302 determines whether an access point having the SSID corresponding to the m-th profile out of the n profiles is detected in search in step S513. In a case where the CPU 302 determines that an access point is detected (YES in step S514), the processing proceeds to step S508. On the other hand, in a case where the CPU 302 determines that an access point is not detected (NO in step S514), the processing proceeds to step S515.

In step S515, the CPU 302 searches for an access point having the SSID corresponding to the m-th profile out of the n profiles by using the channel supporting 5 GHz.

In step S516, the CPU 302 determines whether an access point having the SSID corresponding to the m-th profile out of the n profiles is detected in search in step S515. In a case where the CPU 302 determines that an access point is detected (YES in step S516), the processing proceeds to step S512. On the other hand, in a case where the CPU 302 determines that an access point is not detected (NO in step S516), the CPU 302 determines that an error has occurred and ends the processing.

According to the present exemplary embodiment, the CPU 302 performs a search (search through 2.4 GHz) in step S513 before a search (search through 5 GHz) in step S515 in this way to use 2.4 GHz with priority over 5 GHz.

In step S508, the CPU 302 stores the m-th profile in a storage area in a predetermined memory, such as the nonvolatile memory 305, which also serves as a storage area (storage area for 2.4 GHz) for the connection information of an access point connectable through 2.4 GHz.

In step S512, the CPU 302 stores the m-th profile in a storage area in a predetermined memory, such as the nonvolatile memory 305, which also serves as a storage area (storage area for 5 GHz) for the connection information of an access point connectable through 5 GHz.

In step S509, the CPU 302 increments the wireless connection profile counter variable m.

In step S510, the CPU 302 determines whether the incremented wireless connection profile counter variable m exceeds the number (n) of profiles included in the wireless connection profile. In a case where the CPU 302 determines that the variable m exceeds the number (n) of profiles (YES in step S510), the processing proceeds to step S517. On the other hand, in a case where the CPU 302 determines that the variable m does not exceed the number (n) of profiles (NO in step S510), the processing returns to step S507. When this processing is repeated in this way, each of the profiles included in the wireless connection profile is stored in the storage area for 2.4 GHz or the storage area for 5 GHz.

Figure 6:
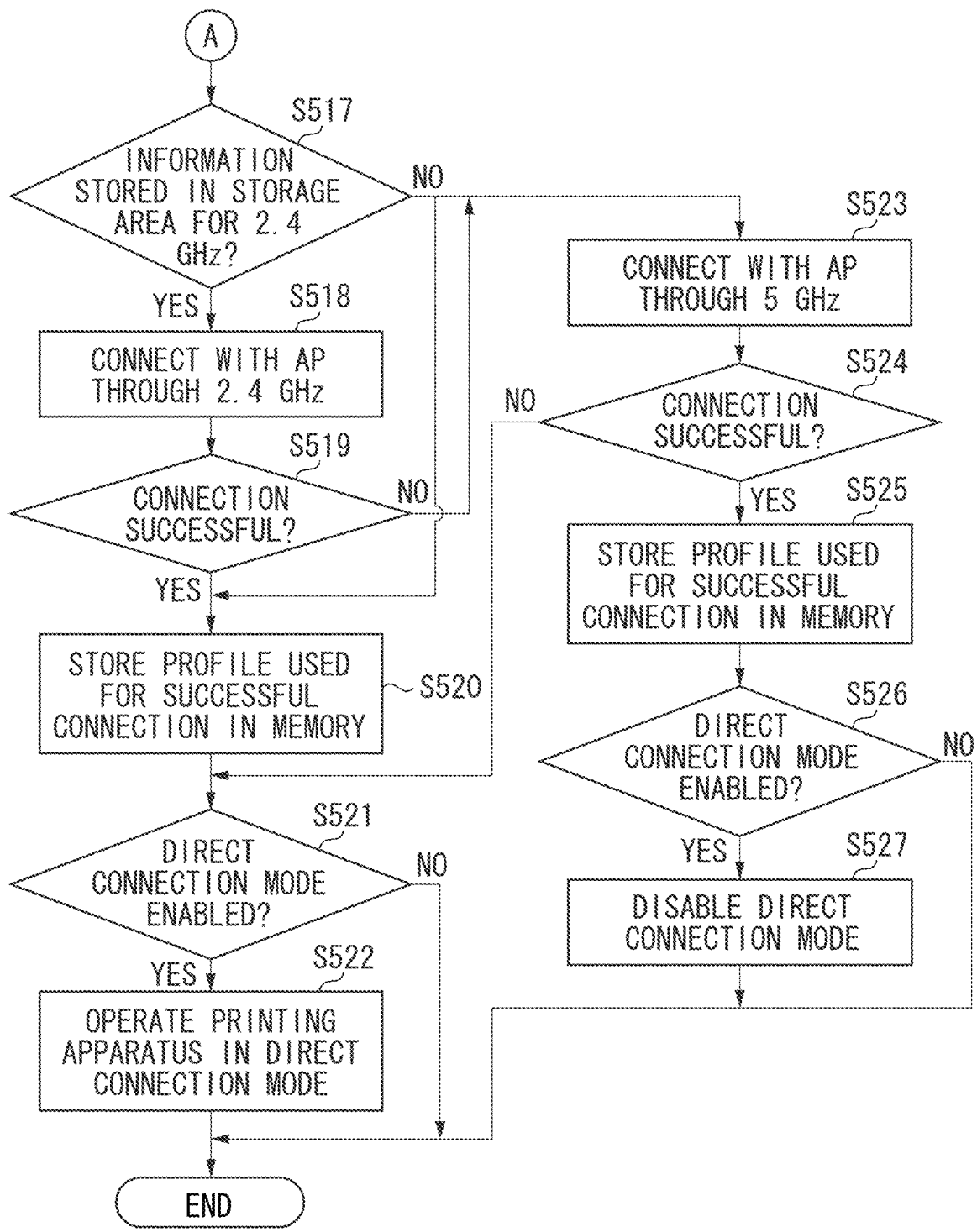
FIG. 6 is a flowchart illustrating the network setting processing based on the automatic setting method performed by the printing apparatus.

Processing in step S517 and subsequent steps will be described below with reference to FIG. 6. The flowchart illustrated in FIG. 6 is implemented, for example, when the CPU 302 reads a program stored in the ROM 303 or the nonvolatile memory 305 into the RAM 304 and then executes the program.

In step S517, the CPU 302 determines whether profile is stored in the storage area for 2.4 GHz. More specifically, the CPU 302 determines whether the connection target access point is an access point connectable through 2.4 GHz. In a case where the CPU 302 determines that profile is stored in the storage area for 2.4 GHz (YES in step S517), the processing proceeds to step S518. On the other hand, in a case where the CPU 302 determines that profile is not stored in the storage area for 2.4 GHz (NO in step S517), the processing proceeds to step S523.

In step S518, the CPU 302 tries establishing a connection with the connection target access point by using the information stored in the storage area for 2.4 GHz and the channel supporting 2.4 GHz. When a plurality of profiles is stored in the storage area for 2.4 GHz, the CPU 302 tries establishing a connection by sequentially using these profiles. Although, in this case, the order of using the profiles is not particularly limited, a profile with an encryption method or authentication method having a high security level may be used with priority over other ones. As a more specific example, a profile with the "WPA2-PSK" authentication method may be used with priority over a profile with the "OPEN" authentication method. As a more specific example, the priority of encryption methods may be as follows: "AES">"TKIP">"WEP128">"WEP64". Although the CPU 302 tries establishing a connection with the connection target access point by sequentially using a plurality of channels supporting 2.4 GHz until connection is successful, the order of channels to be used is not particularly limited.

In step S519, the CPU 302 determines whether a connection with the connection target access point has been successful in step S518. In a case where the CPU 302 determines that the connection has been successful (YES in step S519), the processing proceeds to step S520. On the other hand, in a case where the CPU 302 determines that the connection has not been successful (NO in step S519), the processing proceeds to step S523.

In step S520, the CPU 302 stores the profile that has been used for the successful connection in a predetermined memory such as the nonvolatile memory 305. At this timing, a connection through 2.4 GHz between the printing apparatus 300 and the access point is completed, and accordingly an infrastructure connection through 2.4 GHz can be established. Then, the CPU 302 operates the printing apparatus 300 in the infrastructure connection mode through 2.4 GHz.

In step S521, the CPU 302 determines whether the operation mode storage area includes information indicating that the direct connection mode is enabled. In a case where the CPU 302 determines that the operation mode storage area stores the information (YES in step S521), the processing proceeds to step S522. On the other hand, in a case where the CPU 302 determines that the operation mode storage area does not store the information (NO in step S521), the CPU 302 ends the processing.

In step S522, the CPU 302 operates the printing apparatus 300 in the direct connection mode. If the printing apparatus 300 operates in the infrastructure connection mode at this timing, the simultaneous operation will be performed. As described above, the channel to be used in the simultaneous operation is the channel currently being used in the infrastructure connection mode. Even if the channel that has been used in the direct connection mode before the network setting processing is performed differs from the channel currently being used in the infrastructure connection mode, the latter channel will be used in the direct connection mode after the network setting processing is performed.

On the other hand, in a case where the CPU 302 determines that profile information is not stored in the storage area for 2.4 GHz (NO in step S517), a profile is stored in the storage area for 5 GHz. Then, in step S523, the CPU 302 tries establishing a connection with the connection target access point by using the information stored in the storage area for 5 GHz and the channel supporting 5 GHz. In this case, when a plurality of profiles is stored in the storage area for 5 GHz, the CPU 302 tries establishing a connection by sequentially using these profiles. Although, in this case, the order of using the profiles is not particularly limited, a profile with an encryption method or authentication method having a high security level may be used with priority over other ones. Although the CPU 302 tries establishing a connection with the connection target access point by sequentially using a plurality of channels supporting 5 GHz until connection is successful, the order of channels to be used is not particularly limited.

In step S524, the CPU 302 determines whether a connection with the connection target access point has been successful in step S523. In a case where the CPU 302 determines that the connection has been successful (YES in step S524), the processing proceeds to step S525. On the other hand, in a case where the CPU 302 determines that the connection has not been successful (NO in step S524), the processing proceeds to step S521.

In step S525, the CPU 302 stores the profile that has been used for the successful connection in a predetermined memory such as the nonvolatile memory 305. At this timing, a connection through 5 GHz between the printing apparatus 300 and the access point is completed, and accordingly an infrastructure connection through 5 GHz can be established. Then, the CPU 302 operates the printing apparatus 300 in the infrastructure connection mode through 5 GHz.

In step S526, the CPU 302 determines whether the operation mode storage area includes information indicating that the direct connection mode is enabled. In a case where the CPU 302 determines that the operation mode storage area stores the information (YES in step S526), the processing proceeds to step S527. On the other hand, in a case where the CPU 302 determines that the operation mode storage area does not store the information (NO in step S526), the CPU 302 ends the processing.

In step S527, the CPU 302 disables the direct connection mode. More specifically, the CPU 302 updates the information stored in the operation mode storage area to information indicating that the direct connection mode is disabled. This is because, as described above, some issues arise in the simultaneous operation through 5 GHz. At this timing, the CPU 302 may display a screen for notifying the user that the direct connection mode will be disabled on the display unit 311.

The printing apparatus 300 is able to operate in the direct connection mode by receiving a predetermined operation directly from the user via the operation unit 309. However, according to the present exemplary embodiment, when the printing apparatus 300 operates in the infrastructure connection mode through 5 GHz, the printing apparatus 300 does not operate in the direct connection mode (i.e., the simultaneous operation is not performed). Therefore, when the predetermined operation is received in a state where the printing apparatus 300 operates in the infrastructure connection mode through 5 GHz, the CPU 302 may display a screen for confirming whether the infrastructure connection mode can be canceled on the display unit 311. Then, when the CPU 302 confirms that the infrastructure connection mode may be canceled based on a user operation, the CPU 302 cancels the infrastructure connection mode through 5 GHz and operates the printing apparatus 300 in the direct connection mode. Cancelling the infrastructure connection mode through 5 GHz is equivalent to disconnecting the connection with the access point through 5 GHz. Instead of this configuration, for example, when the printing apparatus 300 operates in the infrastructure connection mode through 5 GHz, the printing apparatus 300 may be configured not to receive a predetermined operation for operating it in the direct connection mode.

The following describes the network setting processing using the terminal apparatus 200.

Figure 7:
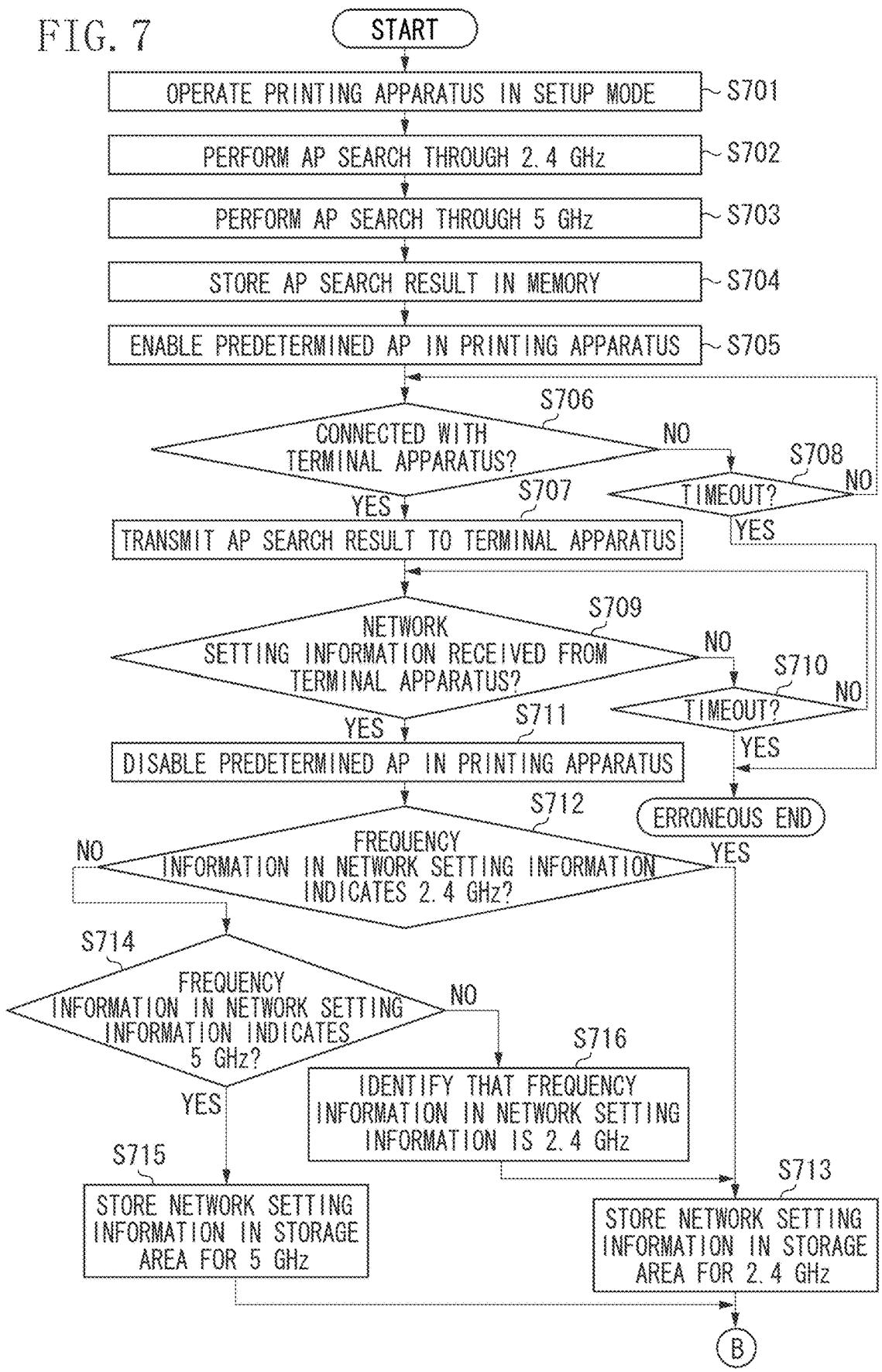
FIG. 7 is a flowchart illustrating another network setting processing using a terminal apparatus performed by the printing apparatus.

FIG. 7 is a flowchart illustrating the network setting processing using the terminal apparatus 200 performed by the printing apparatus 300 according to the present exemplary embodiment. The flowchart illustrated in FIG. 7 is implemented, for example, when the CPU 302 reads a program stored in the ROM 303 or the nonvolatile memory 305 into the RAM 304 and then executes the program. The processing of the flowchart illustrated in FIG. 7 is started when a user operation as a trigger for the network setting processing (an instruction for executing the network setting processing) using the terminal apparatus 200 is performed on the printing apparatus 300.

In step S701, the CPU 302 operates the printing apparatus 300 in a predetermined mode called a setup mode when a user operation as a trigger for the network setting processing is performed. The setup mode is a mode in which the printing apparatus 300 receives the network setting processing. When step S701 is performed in a state where the printing apparatus 300 operates in the direct connection mode, the printing apparatus 300 once stops the operation as an AP. Even when step S701 is performed in a state where the printing apparatus 300 operates in the direct connection mode, information indicating that the direct connection mode is enabled has been kept in the operation mode storage area. Examples of user operations as a trigger for the network setting processing include an operation for a predetermined screen for operating the printing apparatus 300 in the setup mode and an operation for shifting the printing apparatus 300 in the initial setting state from the power OFF state to the power ON state. The initial setting state is a state where the printing apparatus 300 has not yet once performed the network setting processing.

In step S702, the CPU 302 performs AP search as processing for searching for access points existing around the printing apparatus 300 by using the channel supporting 2.4 GHz. Thus, an access point connectable through 2.4 GHz is searched.

In step S703, the CPU 302 performs AP search by using the channel supporting 5 GHz. Thus, access points connectable through 5 GHz are searched.

In step S704, the CPU 302 stores a result of AP search performed in steps S702 and S703 in a memory, such as the RAM 304. The result of AP search includes, for example, a list of access points detected in AP search, connection information for connecting with the access points, information about frequencies and channels used for access point search. The AP search allows the CPU 302 to determine which frequencies and channels has been used to detect which access points. More specifically, the CPU 302 can identify frequencies and channels available for access points detected in AP search.

In step S705, the CPU 302 enables a predetermined access point in the printing apparatus 300 enabled only in the setup mode. The predetermined access point has the SSID including a predetermined character string.

The network setting processing using the terminal apparatus 200 is performed when the setup program as a program for performing the network setting processing is used by the terminal apparatus 200. The terminal apparatus 200 searches for the above-described predetermined access point when a user operation as a trigger for the network setting processing (an instruction for executing the network setting processing) is performed on a screen displayed by the setup program. Then, when the terminal apparatus 200 detects the above-described predetermined access point, the terminal apparatus 200 establishes a Wi-Fi® direct connection with the printing apparatus 300 via the predetermined access point by using the connection information prestored in the setup program.

In step S706, the CPU 302 determines whether the printing apparatus 300 has established a direct connection with the terminal apparatus 200 via the above-described predetermined access point. In a case where the CPU 302 determines that the printing apparatus 300 has established a direct connection with the terminal apparatus 200 (YES in step S706), the processing proceeds to step S707. On the other hand, in a case where the CPU 302 determines that the printing apparatus 300 has not established a direct connection with the terminal apparatus 200 (NO in step S706), the processing proceeds to step S708.

In step S708, the CPU 302 determines whether a predetermined time has elapsed (timeout occurred) from when the printing apparatus 300 has started an operation in the setup mode. In a case where the CPU 302 determines that timeout has occurred (YES in step S708), the CPU 302 determines that an error has occurred and ends the processing. On the other hand, in a case where the CPU 302 determines that timeout has not occurred (NO in step S708), the processing returns to step S706.

In step S707, the CPU 302 transmits the AP search result to the terminal apparatus 200.

In step S709, the CPU 302 determines whether the network setting information has been received from the terminal apparatus 200. The network setting information transmitted from the terminal apparatus 200 can be information for connecting with the access points included in the AP search result transmitted by the printing apparatus 300, information for connecting with the access points included in the AP search result transmitted by the terminal apparatus 200, or information for connecting with an access point specified by the user via the terminal apparatus 200. The printing apparatus 300 can receive the network setting information in a plurality of steps instead of receiving the information at one time. In a case where the CPU 302 determines that the network setting information has been received from the terminal apparatus 200 (YES in step S709), the processing proceeds to step S711. On the other hand, in a case where the CPU 302 determines that the network setting information has not been received from the terminal apparatus 200 (NO in step S709), the processing proceeds to step S710. According to the present exemplary embodiment, the network setting information transmitted from the terminal apparatus 200 includes, as frequency band information, information indicating the channel to be used by the connection target access point. Referring to the channel information, the CPU 302 can identify whether the channel supports the 2.4 GHz frequency band or supports the 5 GHz frequency band.

In step S710, the CPU 302 determines whether a predetermined time has elapsed (timeout occurred) from when the printing apparatus 300 has started an operation in the setup mode. In a case where the CPU 302 determines that timeout has occurred (YES in step S710), the CPU 302 determines that an error has occurred and ends the processing. On the other hand, in a case where the CPU 302 determines that timeout has not occurred (NO in step S710), the processing returns to step S709.

In step S711, the CPU 302 disables the predetermined access point in the printing apparatus 300 which is disabled only in the setup mode. More specifically, the CPU 302 once disconnects the connection with the terminal apparatus 200.

In step S712, the CPU 302 determines whether the network setting information received from the terminal apparatus 200 includes information indicating that the frequency to be used by the connection target access point is 2.4 GHz. In a case where the CPU 302 determines that the network setting information includes information indicating 2.4 GHz (YES in step S712), the processing proceeds to step S713. On the other hand, in a case where the CPU 302 determines that the network setting information does not includes information indicating 2.4 GHz (NO in step S712), the processing proceeds to step S714.

In step S713, the CPU 302 stores the network setting information received from the terminal apparatus 200 in the storage area for 2.4 GHz.

In step S714, the CPU 302 determines whether the network setting information received from the terminal apparatus 200 includes information indicating that the frequency to be used by the connection target access point is 5 GHz. In a case where the CPU 302 determines that the network setting information includes information indicating 5 GHz (YES in step S714), the processing proceeds to step S715. On the other hand, in a case where the CPU 302 determines that the network setting information does not include information indicating 5 GHz (NO in step S714), the processing proceeds to step S716.

In step S715, the CPU 302 stores the network setting information received from the terminal apparatus 200 in the storage area for 5 GHz.

In a case where the CPU 302 determines that the network setting information does not include information indicating 2.4 GHz (NO in step S712) and determines that the network setting information does not include information indicating 5 GHz (NO in step S714), the network setting information received from the terminal apparatus 200 does not include information about the frequency to be used by the connection target access point. As described above, the present exemplary embodiment uses 2.4 GHz with priority over 5 GHz. In step S716, therefore, the CPU 302 identifies that the frequency to be used by the connection target access point is 2.4 GHz.

Figure 8:
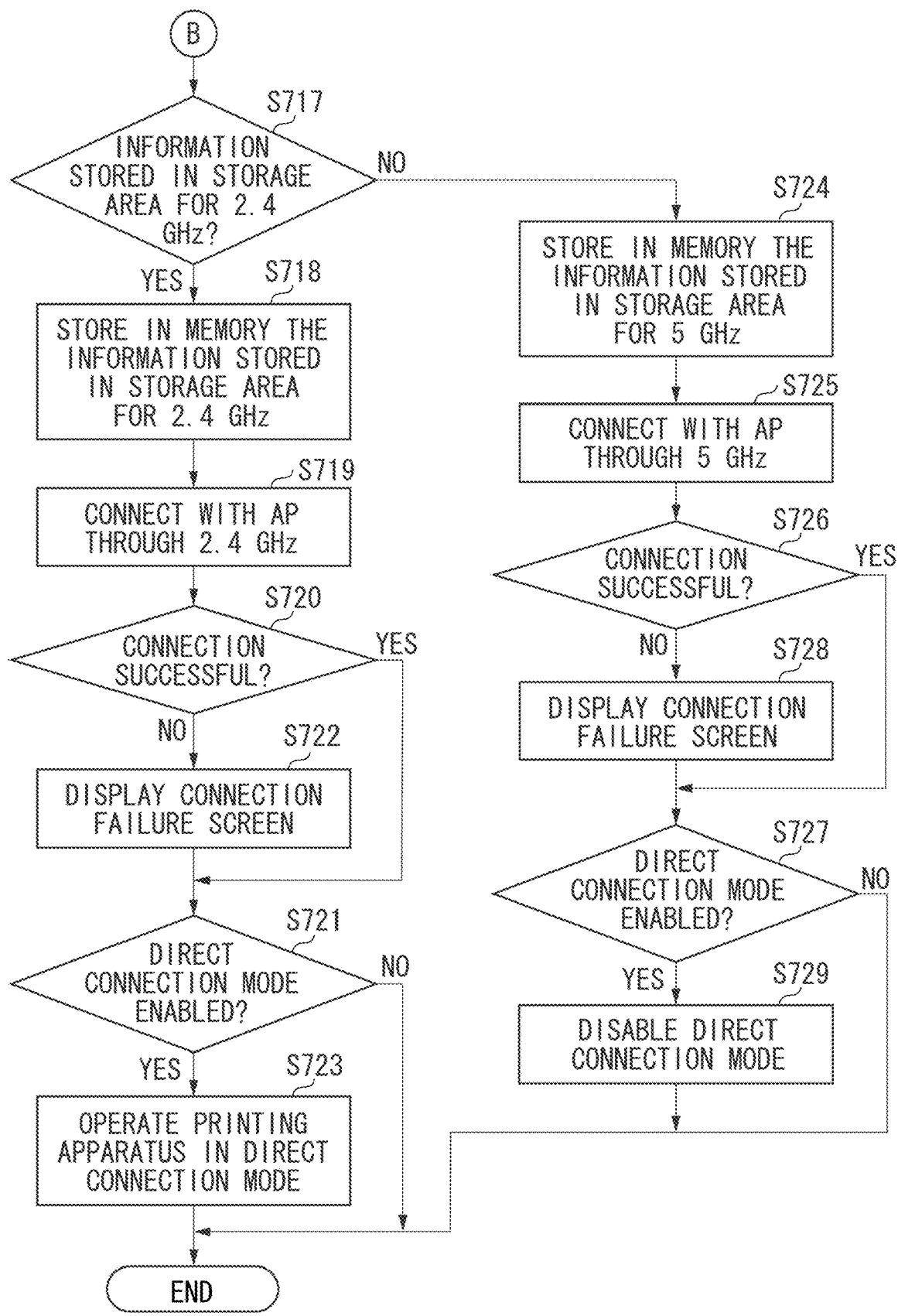
FIG. 8 is a flowchart illustrating the network setting processing using the terminal apparatus performed by the printing apparatus.

Processing in step S717 and subsequent steps will be described below with reference to FIG. 8. The flowchart illustrated in FIG. 8 is implemented, for example, when the CPU 302 reads a program stored in the ROM 303 or the nonvolatile memory 305 into the RAM 304 and then executes the program.

In step S717, the CPU 302 determines whether the network setting information is stored in the storage area for 2.4 GHz. More specifically, the CPU 302 determines whether the connection target access point is an access point connectable through 2.4 GHz. In a case where the CPU 302 determines that the network setting information is stored in the storage area for 2.4 GHz (YES in step S717), the processing proceeds to step S718. On the other hand, in a case where the CPU 302 determines that the network setting information is not stored in the storage area for 2.4 GHz (NO in step S717), the processing proceeds to step S724.

In step S718, the CPU 302 stores the network setting information, which is stored in the storage area for 2.4 GHz, in a predetermined memory such as the nonvolatile memory 305.

In step S719, the CPU 302 tries establishing a connection with the connection target access point by using the network setting information stored in the storage area for 2.4 GHz and the channel supporting 2.4 GHz. According to the present exemplary embodiment, as described above, the frequency band information is information indicating the channel. Therefore, the CPU 302 tries establishing a connection with the connection target access point by using the channel indicated by the information out of the channels supporting 2.4 GHz.

In step S720, the CPU 302 determines whether a connection with the connection target access point has been successful in step S719. In a case where the CPU 302 determines that the connection has been successful (YES in step S720), the processing proceeds to step S721. On the other hand, when the CPU 302 determines that the connection has not been successful (NO in step S720), the processing proceeds to step S722. In a case where a connection with the connection target access point has been successful, a connection through 2.4 GHz between the printing apparatus 300 and the access point is completed, and accordingly an infrastructure connection through 2.4 GHz can be established. Therefore, the CPU 302 operates the printing apparatus 300 in the infrastructure connection mode through 2.4 GHz.

In step S722, the CPU 302 displays a screen indicating that a connection with the connection target access point has failed on the display unit 311. In this case, the CPU 302 can transmit to the terminal apparatus 200 information for displaying a screen indicating that a connection with the connection target access point has failed on the display unit 209. Also, in step S725, the CPU 302 can try establishing a connection with the connection target access point by using the channel supporting 5 GHz. The CPU 302 can try establishing a connection with the connection target access point by using a channel other than the channel used in step S719 out of the channels supporting 2.4 GHz.

In step S721, the CPU 302 determines whether the operation mode storage area includes information indicating that the direct connection mode is enabled. In a case where the CPU 302 determines that the operation mode storage area includes the information (YES in step S721), the processing proceeds to step S723. On the other hand, in a case where the CPU 302 determines that the operation mode storage area does not include the information (NO in step S721), the CPU 302 ends the processing.

In step S723, the CPU 302 operates the printing apparatus 300 in the direct connection mode. This processing is similar to the processing in step S522.

In a case where the network setting information is stored in the storage area for 2.4 GHz (NO in step S717), the network setting information is included in the storage area for 5 GHz. Therefore, in step S724, the CPU 302 stores the network setting information, which is stored in the storage area for 5 GHz, in a predetermined memory such as the nonvolatile memory 305.

In step S725, the CPU 302 tries establishing a connection with the connection target access point by using the network setting information stored in the storage area for 5 GHz and the channel supporting 5 GHz. According to the present exemplary embodiment, as described above, the frequency band information is information indicating the channel. Therefore, the CPU 302 tries establishing a connection with the connection target access point by using the channel indicated by the information out of the channels supporting 5 GHz.

In step S726, the CPU 302 determines whether a connection with the connection target access point in step S725 has been successful. When the CPU 302 determines that the connection has been successful (YES in step S726), the processing proceeds to step S727. On the other hand, in a case where the CPU 302 determines that the connection has not been successful (NO in step S726), the processing proceeds to step S728. In a case where a connection with the connection target access point has been successful, a connection through 5 GHz between the printing apparatus 300 and the access point is completed, and accordingly an infrastructure connection through 5 GHz can be established. Therefore, the CPU 302 operates the printing apparatus 300 in the infrastructure connection mode through 5 GHz.

In step S728, the CPU 302 displays a screen indicating that a connection with the connection target access point has failed on the display unit 311. In this case, the CPU 302 can transmit to the terminal apparatus 200 information for displaying a screen indicating that a connection with the connection target access point has failed on the display unit 209. Then, in step S719, the CPU 302 can try establishing a connection with the connection target access point by using the channel supporting 2.4 GHz. The CPU 302 can also try establishing a connection with the connection target access point by using a channel other than the channel used in step S728 out of the channels supporting 5 GHz.

In step S727, the CPU 302 determines whether the operation mode storage area includes information indicating that the direct connection mode is enabled. In a case where the CPU 302 determines that the operation mode storage area includes the information (YES in step S727), the processing proceeds to step S729. On the other hand, in a case where the CPU 302 determines that the operation mode storage area does not include the information (NO in step S727), the CPU 302 ends the processing.

In step S729, the CPU 302 disables the direct connection mode. This processing is similar to the processing in step S522.

The following describes a configuration for suitably executing the network setting processing via the terminal apparatus 200 based on a method different from the one in the above-described configuration.

FIG. 9 is a flowchart illustrating the network setting processing performed by the printing apparatus 300 according to the present exemplary embodiment. The flowchart illustrated in FIG. 9 is implemented, for example, when the CPU 302 reads a program stored in the ROM 303 or the nonvolatile memory 305 into the RAM 304 and then executes the program. The processing of the flowchart illustrated in FIG. 9 is started when a user operation as a trigger for the network setting processing (an instruction for executing the network setting processing) is performed on the printing apparatus 300.

Processing in steps S901 to S916 is similar to the processing in steps S701 to S716, respectively, and redundant descriptions thereof will be omitted.

In a case where the CPU 302 determines that the network setting information does not include information indicating 5 GHz (NO in step S914), the network setting information received from the terminal apparatus 200 does not include the frequency band information. Therefore, in step S917, the CPU 302 determines whether the AP search result stored in step S904 includes the information included in the network setting information received from the terminal apparatus 200. Examples of the information included in the network setting information received from the terminal apparatus 200 include a SSID, an authentication method, an encryption method, and a MAC address. In a case where the CPU 302 determines that the AP search result includes the information (YES in step S917), the processing proceeds to step S918. On the other hand, in a case where the CPU 302 determines that the AP search result does not include the information (NO in step S917), the processing proceeds to step S916. In a case where the CPU 302 determines that the AP search result includes the information (YES in step S917), the CPU 302 identifies from the AP search result the frequency information corresponding to the information included in the network setting information received from the terminal apparatus 200.

In step S918, the CPU 302 determines whether the frequency information, which is identified from the AP search result, corresponding to the information included in the network setting information received from the terminal apparatus 200 is 2.4 GHz. In a case where the CPU 302 determines that the frequency information indicates 2.4 GHz, (YES in step S918), the processing proceeds to step S913. On the other hand, in a case where the CPU 302 determines that the frequency information does not indicate 2.4 GHz (NO in step S918), the processing proceeds to step S915.

Processing after steps S913 and S915 is similar to the processing illustrated in FIG. 8, and redundant descriptions thereof will be omitted.

Although the printing apparatus 300 is described to receive the network setting information for setting the infrastructure connection mode from the terminal apparatus 200, the printing apparatus 300 can receive the network setting information for setting the direct connection mode from the terminal apparatus 200. In this case, after the printing apparatus 300 notifies the terminal apparatus 200 of the connection information for connecting with an access point in the printing apparatus 300 which will be enabled in the direct connection mode, the printing apparatus 300 enables the access point and then establishes a direct connection with the terminal apparatus 200.

It is desirable for the terminal apparatus 200 to transmit, as the network setting information for setting the infrastructure connection mode, information for connecting with the access point with which the terminal apparatus 200 has connected before the network setting processing. This allows the printing apparatus 300 to connect with the access point. Then, if the terminal apparatus 200 re-connects with the access point, an infrastructure connection is established between the terminal apparatus 200 and the printing apparatus 300.

With the above-described configuration, if the frequency band information is not notified to the printing apparatus 300 in the network setting processing, the CPU 302 can try establishing a connection with an access point by using 2.4 GHz with priority over 5 GHz. When a plurality of pieces of information about the frequency bands available for the connection target access point is notified to the printing apparatus 300 in the network setting processing, the CPU 302 can try establishing a connection with an access point by using 2.4 GHz with priority over 5 GHz.

Although the printing apparatus 300 is described to support at least either one of the 2.4 GHz and the 5 GHz frequency bands, the configuration of the printing apparatus 300 is not limited thereto. More specifically, the printing apparatus 300 can support frequency bands other than the 2.4 GHz and the 5 GHz frequency bands. The printing apparatus 300 can support three or more frequency bands.

The printing apparatus 300 is described to connect with APs by using the channels supporting the 2.4 GHz frequency band with priority, if no frequency band information is received or a plurality of pieces of frequency band information is received in the network setting processing. However, the configuration of the printing apparatus 300 is not limited thereto. For example, in the above-described configuration, the printing apparatus 300 can connect with APs by preferentially using channels with which switching through DFS is not performed (channels not to be used by a specific apparatus such as a weather radar), out of the channels supporting the 5 GHz frequency band.

In the above-described configuration, the printing apparatus 300 receives the network setting information in a state where the printing apparatus 300 operates in the setup mode, and the printing apparatus 300 and the terminal apparatus 200 are connected with each other through Wi-Fi® in the network setting processing using the terminal apparatus 200. However, the configuration of the printing apparatus 300 is not limited thereto. For example, the printing apparatus 300 can receive the setting information via a non-Wi-Fi® communication method in a state where the printing apparatus 300 and the terminal apparatus 200 are connected with each other through a non-Wi-Fi® communication method. As a more specific example, the printing apparatus 300 can start an operation when an operation as a trigger for an operation in the setup mode is performed in a state where communication with the host terminal 102 based on a communication method other than Wireless LAN (WLAN) is possible.

Examples of non-WLAN communication methods include Bluetooth® Classic, Bluetooth® Low Energy, and NFC.

The above-described exemplary embodiment is also implemented by performing the following processing. More specifically, software (program) for implementing the functions of the above-described exemplary embodiments is supplied to a system or apparatus via a network or various types of storage media, and a computer (or CPU or micro processing unit (MPU)) of the system or apparatus reads and executes the program. The program may be executed by either one computer or a plurality of computers in a collaborated way. Not all of the above-described processing need to be implemented by software. A part or whole of the processing may be implemented by hardware such as an Application Specific Integrated Circuit (ASIC). One CPU do not necessarily perform the entire processing, i.e., a plurality of CPUs may suitably perform processing in a cooperative way.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus that wirelessly communicates in a first frequency band and a second frequency band, the communication apparatus comprising:
at least one processor,
wherein the at least one processor performs operations of:
a connection establishment unit configured to, after the communication apparatus receives from a user a predetermined operation for establishing a predetermined connection between the communication apparatus and an external apparatus, establish the predetermined connection; and
a control unit configured to
control, based on that the predetermined operation is performed in a state in which the communication apparatus is operating in a first state for performing peer-to-peer communication with another apparatus and that the predetermined connection using the first frequency band is established, the communication apparatus such that the communication apparatus operates both in the first state and a second state in which the communication apparatus is establishing the predetermined connection, and
control, based on that the predetermined operation is performed in a state in which the communication apparatus is operating in the first state and that the predetermined connection using the second frequency band is established, the communication apparatus such that the communication apparatus is not operating in the first state but is operating in the second state,
wherein a channel used in the predetermined connection using the second frequency band is changed from a first channel corresponding to the second frequency band to a second channel that is different from the first channel by Dynamic Frequency Selection.

2. The communication apparatus according to claim 1, wherein, based on that the predetermined operation is performed in a state in which the communication apparatus is operating in the first state and that the predetermined connection using the first frequency band is established, the communication apparatus is controlled such that the communication apparatus is operating in the first state for performing the peer-to-peer communication using the first frequency band and the second state.

3. The communication apparatus according to claim 1, wherein the at least one processor further performs an operation of:
a receiving unit configured to, after the predetermined operation is performed, receive setting information used in processing for wirelessly connecting with the external apparatus,
wherein the predetermined connection is established based on the setting information.

4. The communication apparatus according to claim 3, wherein the predetermined connection is established using the first frequency band with priority over the second frequency band, in a case where the received setting information does not include frequency band information corresponding to the first frequency band and does not include frequency band information corresponding to the second frequency band.

5. The communication apparatus according to claim 3, wherein the predetermined connection is established using the first frequency band with priority over the second frequency band, in a case where the setting information includes both frequency band information corresponding to the first frequency band and frequency band information corresponding to the second frequency band.

6. The communication apparatus according to claim 3, wherein the predetermined connection using the first frequency band is established in a case where the setting information includes the frequency band information corresponding to the first frequency band and does not include the frequency band information corresponding to the second frequency band.

7. The communication apparatus according to claim 3, wherein the predetermined connection using the second frequency band is established in a case where the setting information does not include the frequency band information corresponding to the first frequency band and includes the frequency band information corresponding to the second frequency band.

8. The communication apparatus according to claim 3, wherein the setting information is received from the external apparatus.

9. The communication apparatus according to claim 3, wherein the setting information is received from a terminal device different from the external apparatus.

10. The communication apparatus according to claim 1, wherein the external apparatus determines a communication channel to be used in the predetermined connection and the communication apparatus uses the communication channel determined by the external apparatus in the predetermined connection.

11. The communication apparatus according to claim 1, wherein the predetermined connection is established by any of AirStation One-Touch Secure System, Rakuraku Musen Start, and Wi-Fi Protected Setup.

12. The communication apparatus according to claim 1, wherein the first frequency band is a 2.4 GHz frequency band, and
wherein the second frequency band is a 5 GHz frequency band.

13. The communication apparatus according to claim 1, wherein operating in the first state is stopped based on that the predetermined operation is performed when the communication apparatus is operating in the first state,
wherein the predetermined connection is established after the operating in the first state is stopped,
wherein, based on that the predetermined connection is established using the first frequency band based on the predetermined operation, the communication apparatus resumes, in a state that the communication apparatus is operating in the second state, operating in the first state, and
wherein, based on that the predetermined connection is established using the second frequency band based on the predetermined operation, the communication apparatus does not resume, in a state that the communication apparatus is operating in the second state, operating in the first state.

14. The communication apparatus according to claim 1, wherein the at least one processor further performs operations of:
a receiving unit configured to receive from a user a particular operation for causing the communication apparatus to operate in the first state; and
an operation control unit configured to cause the communication apparatus to operate in the first state in a case where the particular operation is received;
wherein the operation control unit does not cause the communication apparatus to operate in the first state when the predetermined connection is established using the second frequency band, even if the particular operation is received.

15. The communication apparatus according to claim 1, wherein the at least one processor further performs operations of:
a receiving unit configured to receive from a user a particular operation for causing the communication apparatus to operate in the first state; and
an operation control unit configured to cause the communication apparatus to operate in the first state in a case where the particular operation is received;
wherein the communication apparatus does not accept the particular operation when the predetermined connection is established using the second frequency band.

16. The communication apparatus according to claim 1, wherein the at least one processor further performs operations of:
a receiving unit configured to receive from a user a particular operation for causing the communication apparatus to operate in the first state; and
an operation control unit configured to cause the communication apparatus to operate in the first state in a case where the particular operation is received;
wherein the communication apparatus operates in the first state after disconnecting the predetermined connection in a case where the particular operation is received when the predetermined connection is established using the second frequency band.

17. The communication apparatus according to claim 1, wherein the first state is a state in which the communication apparatus is operating as a master station.

18. The communication apparatus according to claim 1, wherein the first state is a state for Wi-Fi Direct connection to said another apparatus.

19. The communication apparatus according to claim 1, wherein the at least one processor further performs operations of:
a printer unit configured to perform printing on a recording medium using a recording agent.

20. The communication apparatus according to claim 19, wherein the recording agent is ink.

21. A control method of a communication apparatus that wirelessly communicates in a first frequency band and a second frequency band, the control method comprising:
establishing a predetermined connection after the communication apparatus receives from a user a predetermined operation for establishing the predetermined connection between the communication apparatus and an external apparatus; and
controlling, based on that the predetermined operation is performed in a state in which the communication apparatus is operating in a first state for performing peer-to-peer communication with another apparatus and that the predetermined connection using the first frequency band is established, the communication apparatus such that the communication apparatus isoperates both in the first state and a second state in which the communication apparatus is establishing the predetermined connection,
controlling, based on that the predetermined operation is performed in a state in which the communication apparatus is operating in the first state and that the predetermined connection using the second frequency band is established, the communication apparatus such that the communication apparatus is not operating in the first state but is operating in the second state,
wherein a channel used in the predetermined connection using the second frequency band is changed from a first channel corresponding to the second frequency band to a second channel that is different from the first channel by Dynamic Frequency Selection.

22. A communication apparatus that wirelessly communicates in a first frequency band and a second frequency band, the communication apparatus comprising:
at least one processor,
wherein the at least one processor performs operations of:
a connection establishment unit configured to, after the communication apparatus receives from a user a predetermined operation for establishing a predetermined connection between the communication apparatus and an external apparatus by the IEEE 802.11 series standard, establish the predetermined connection; and a control unit configured to control, based on that the predetermined operation is performed in a state in which the communication apparatus is operating in a first state for performing peer-to-peer communication with another apparatus and that the predetermined connection using the first frequency band is established, the communication apparatus such that the communication apparatus operates both in the first state and a second state in which the communication apparatus is establishing the predetermined connection, and control, based on that the predetermined operation is performed in a state in which the communication apparatus is operating in the first state and that the predetermined connection using the second frequency band is established, the communication apparatus such that no connection, of the communication apparatus, for peer-to-peer communication by the IEEE 802.11 series standard is maintained but the predetermined connection is maintained.

23. The communication apparatus according to claim 22, wherein, based on that the predetermined operation is performed in a state in which the communication apparatus is operating in the first state and that the predetermined connection using the first frequency band is established, the communication apparatus is controlled such that the communication apparatus is operating in the first state for performing the peer-to-peer communication using the first frequency band and the second state.

24. The communication apparatus according to claim 22, wherein the at least one processor further performs an operation of:

a receiving unit configured to, after the predetermined operation is performed, receive setting information used in processing for wirelessly connecting with the external apparatus, and wherein the predetermined connection is established based on the setting information.

25. The communication apparatus according to claim 24, wherein the predetermined connection is established using the first frequency band with priority over the second frequency band, in a case where the received setting information does not include frequency band information corresponding to the first frequency band and does not include frequency band information corresponding to the second frequency band.

26. The communication apparatus according to claim 24, wherein the predetermined connection is established using the first frequency band with priority over the second frequency band, in a case where the setting information includes both frequency band information corresponding to the first frequency band and frequency band information corresponding to the second frequency band.

27. The communication apparatus according to claim 24, wherein the predetermined connection using the first frequency band is established in a case where the setting information includes the frequency band information corresponding to the first frequency band and does not include the frequency band information corresponding to the second frequency band.

28. The communication apparatus according to claim 24, wherein the predetermined connection using the second frequency band is established in a case where the setting information does not include the frequency band information corresponding to the first frequency band and includes the frequency band information corresponding to the second frequency band.

29. The communication apparatus according to claim 24, wherein the setting information is received from the external apparatus.

30. The communication apparatus according to claim 24, wherein the setting information is received from a terminal device different from the external apparatus.

31. The communication apparatus according to claim 23, wherein the external apparatus determines a communication channel to be used in the predetermined connection and the communication apparatus uses the communication channel determined by the external apparatus in the predetermined connection.

32. The communication apparatus according to claim 23, wherein the predetermined connection is established by any of AirStation One-Touch Secure System, Rakuraku Musen Start, and Wi-Fi Protected Setup.

33. The communication apparatus according to claim 23, wherein the first frequency band is a 2.4GHz frequency band, and wherein the second frequency band is a 5GHz frequency band.

34. The communication apparatus according to claim 23, wherein operating in the first state is stopped based on that the predetermined operation is performed when the communication apparatus is operating in the first state, wherein the predetermined connection is established after the operating in the first state is stopped, wherein, based on that the predetermined connection is established using the first frequency band based on the predetermined operation, the communication apparatus resumes, in a state that the communication apparatus is operating in the second state, operating in the first state, and wherein, based on that the predetermined connection is established using the second frequency band based on the predetermined operation, the communication apparatus does not resume, in a state that the communication apparatus is operating in the second state, operating in the first state.

35. The communication apparatus according to claim 22, wherein the at least one processor further performs operations of:

a receiving unit configured to receive from a user a particular operation for causing the communication apparatus to operate in the first state; and an operation control unit configured to cause the communication apparatus to operate in the first state in a case where the particular operation is received, and wherein the operation control unit does not cause the communication apparatus to operate in the first state when the predetermined connection is established using the second frequency band, even if the particular operation is received.

36. The communication apparatus according to claim 22, wherein the at least one processor further performs operations of:

a receiving unit configured to receive from a user a particular operation for causing the communication apparatus to operate in the first state; and an operation control unit configured to cause the communication apparatus to operate in the first state in a case where the particular operation is received, and wherein the communication apparatus does not accept the particular operation when the predetermined connection is established using the second frequency band.

37. The communication apparatus according to claim 22, wherein the at least one processor further performs operations of:
   a receiving unit configured to receive from a user a particular operation for causing the communication apparatus to operate in the first state; and
   an operation control unit configured to cause the communication apparatus to operate in the first state in a case where the particular operation is received, and
   wherein the communication apparatus operates in the first state after disconnecting the predetermined connection in a case where the particular operation is received when the predetermined connection is established using the second frequency band.

38. The communication apparatus according to claim 22, wherein the first state is a state in which the communication apparatus is operating as a master station.

39. The communication apparatus according to claim 22, wherein the first state is a state for Wi-Fi Direct connection to said another apparatus.

40. The communication apparatus according to claim 22, wherein the at least one processor further performs operations of:
   a printer unit configured to perform printing on a recording medium using a recording agent.

41. The communication apparatus according to claim 40, wherein the recording agent is ink.

42. The communication apparatus according to claim 22, wherein a channel used in the predetermined connection using the second frequency band is changed from a first channel corresponding to the second frequency band to a second channel that is different from the first channel by Dynamic Frequency Selection.

43. A control method of a communication apparatus that wirelessly communicates in a first frequency band and a second frequency band, the control method comprising:
   establishing a predetermined connection after the communication apparatus receives from a user a predetermined operation for establishing the predetermined connection between the communication apparatus and an external apparatus by the IEEE 802.11 series standard;
   controlling, based on that the predetermined operation is performed in a state in which the communication apparatus is operating in a first state for performing peer-to-peer communication with another apparatus and that the predetermined connection using the first frequency band is established, the communication apparatus such that the communication apparatus operates both in the first state and a second state in which the communication apparatus is establishing the predetermined connection; and
   controlling, based on that the predetermined operation is performed in a state in which the communication apparatus is operating in the first state and that the predetermined connection using the second frequency band is established, the communication apparatus such that no connection, of the communication apparatus, for peer-to-peer communication by the IEEE 802.11 series standard is maintained but the predetermined connection is maintained.

* * * * *